March 18, 1952

L. C. PEARCE 2,589,428

COLLATING MACHINE

Filed Oct. 10, 1950

INVENTOR.
LEWIS C. PEARCE

BY

ATTORNEYS

March 18, 1952 L. C. PEARCE 2,589,428
COLLATING MACHINE
Filed Oct. 10, 1950 21 Sheets-Sheet 2

INVENTOR.
LEWIS C. PEARCE
BY
Mellin and Hanson
ATTORNEYS

March 18, 1952 L. C. PEARCE 2,589,428
COLLATING MACHINE

Filed Oct. 10, 1950 21 Sheets-Sheet 5

INVENTOR.
LEWIS C. PEARCE
BY
*Mellin and Hanson*
ATTORNEYS

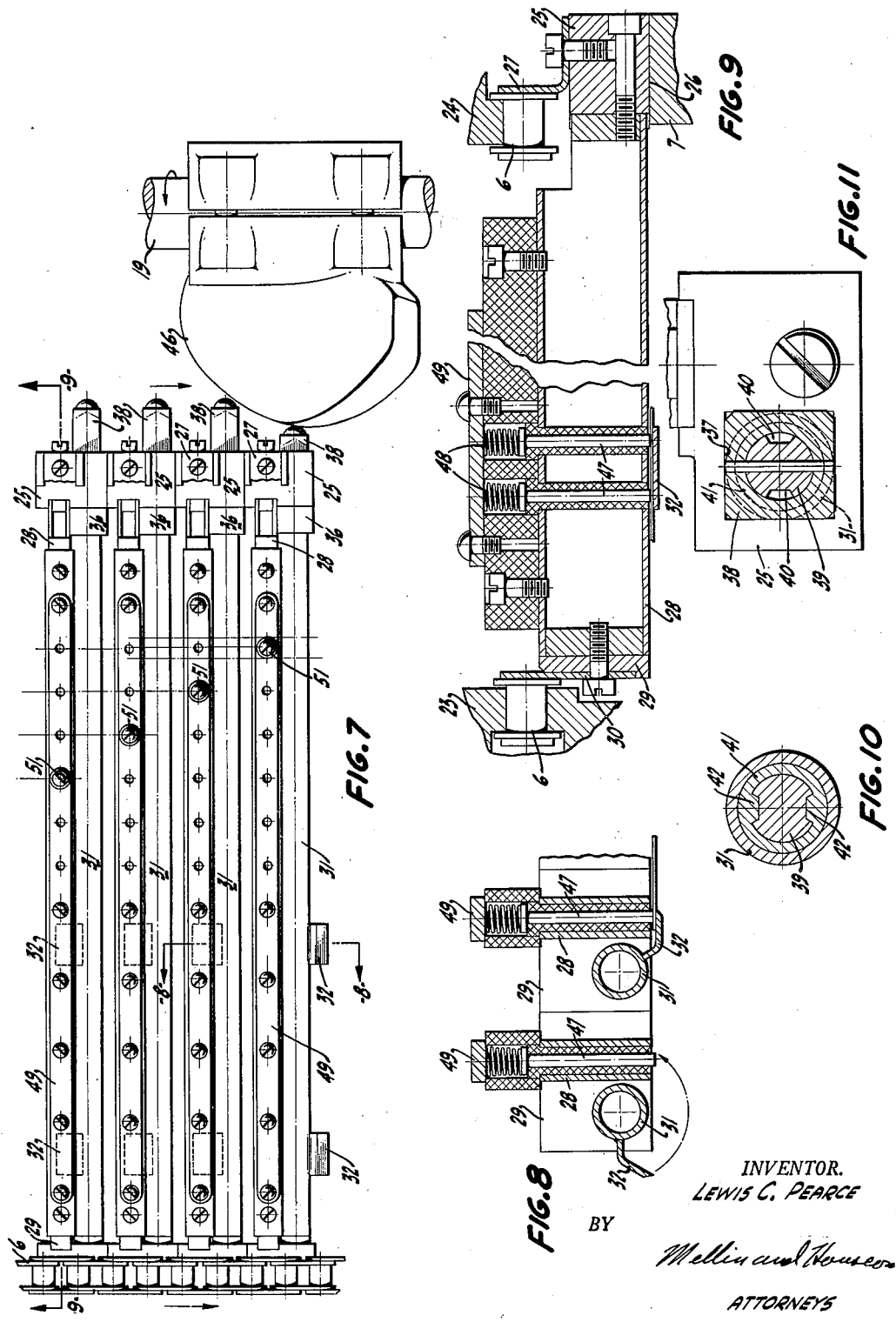

March 18, 1952     L. C. PEARCE     2,589,428
COLLATING MACHINE

Filed Oct. 10, 1950     21 Sheets-Sheet 7

INVENTOR.
LEWIS C. PEARCE
BY
ATTORNEYS

March 18, 1952   L. C. PEARCE   2,589,428
COLLATING MACHINE
Filed Oct. 10, 1950   21 Sheets-Sheet 8
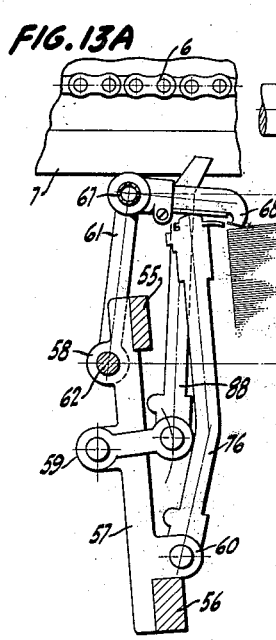
FIG.13A
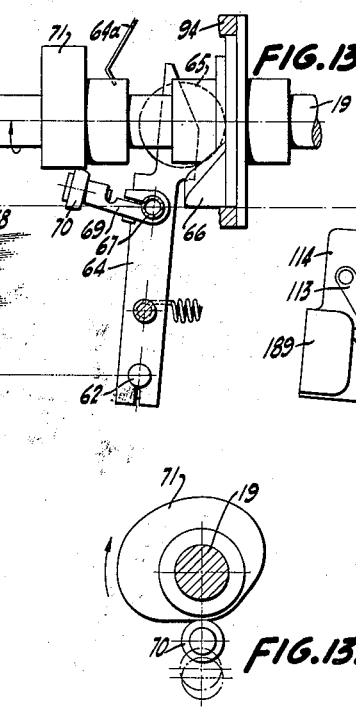
FIG.13B
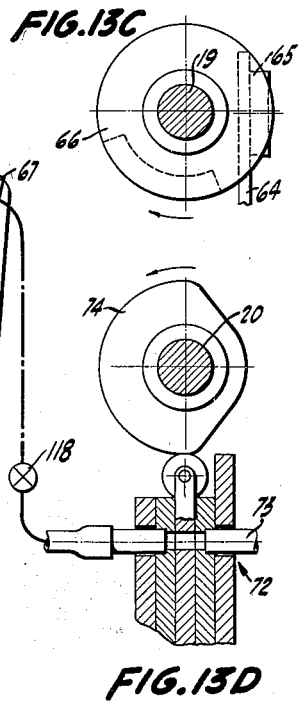
FIG.13C
FIG.13D
FIG.13E
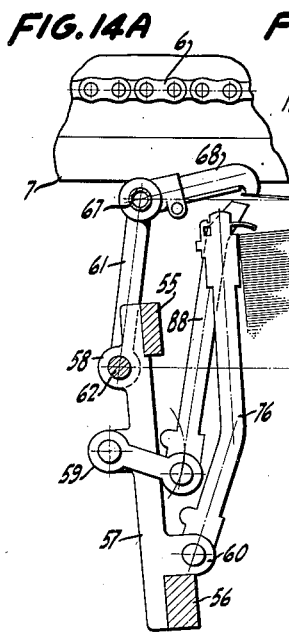
FIG.14A
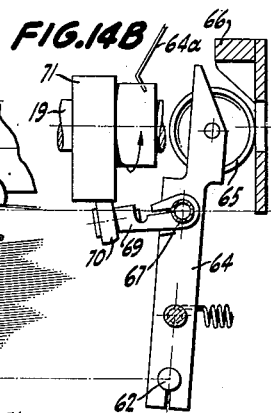
FIG.14B
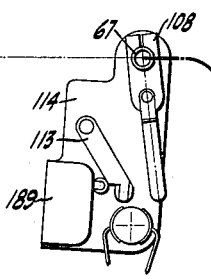
FIG.14C
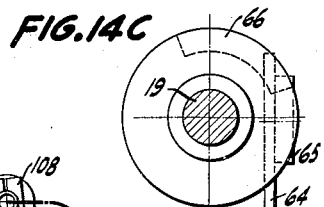
FIG.14D
INVENTOR.
LEWIS C. PEARCE
BY
Mellin and Hanson
ATTORNEYS March 18, 1952  L. C. PEARCE  2,589,428
COLLATING MACHINE
Filed Oct. 10, 1950  21 Sheets-Sheet 9
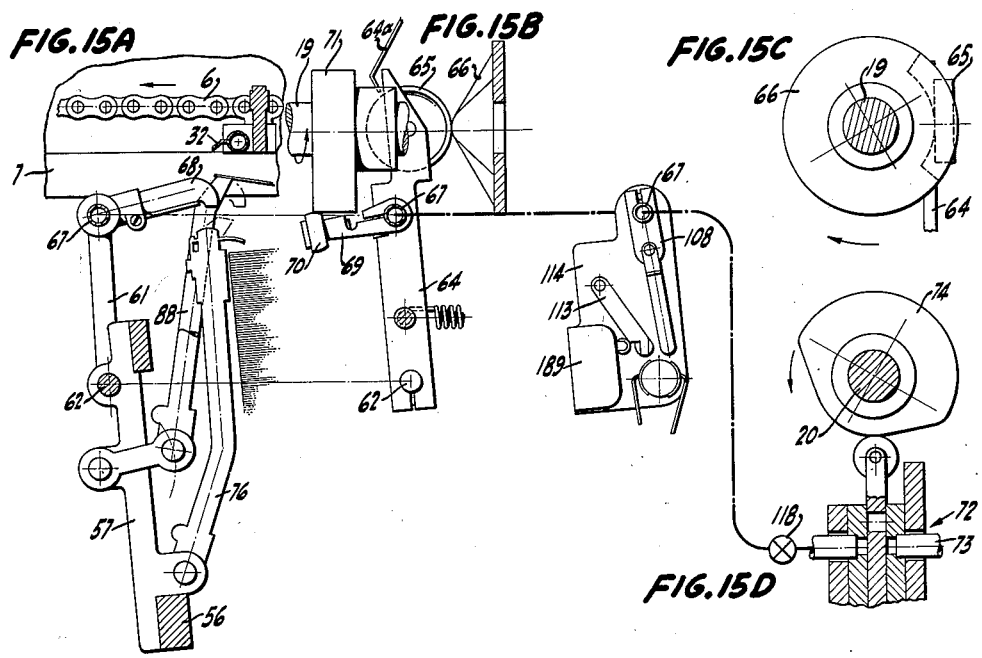
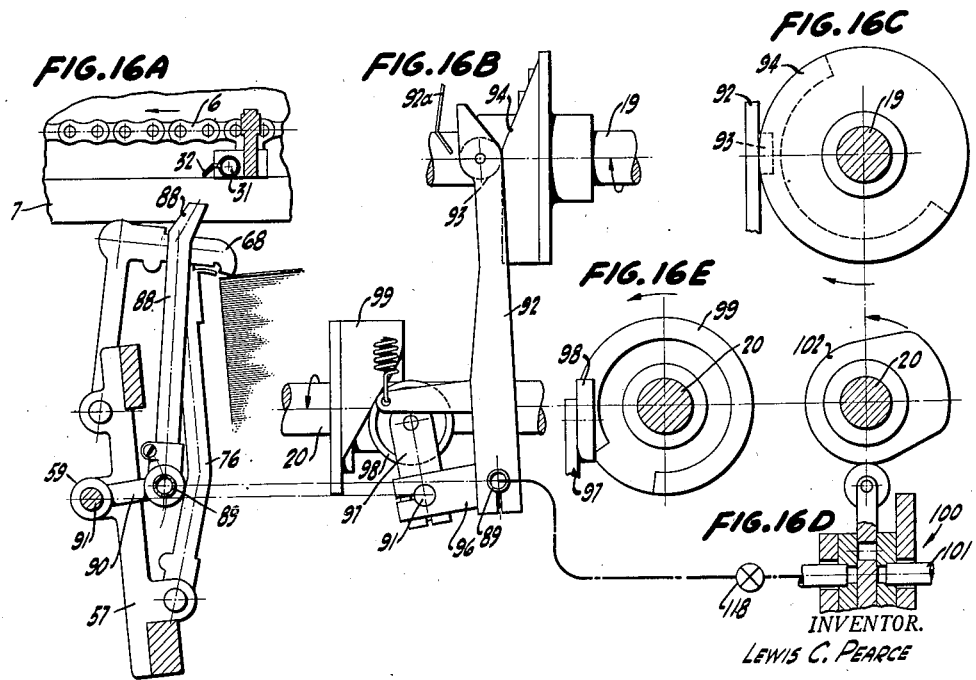
INVENTOR.
LEWIS C. PEARCE
BY
ATTORNEYS

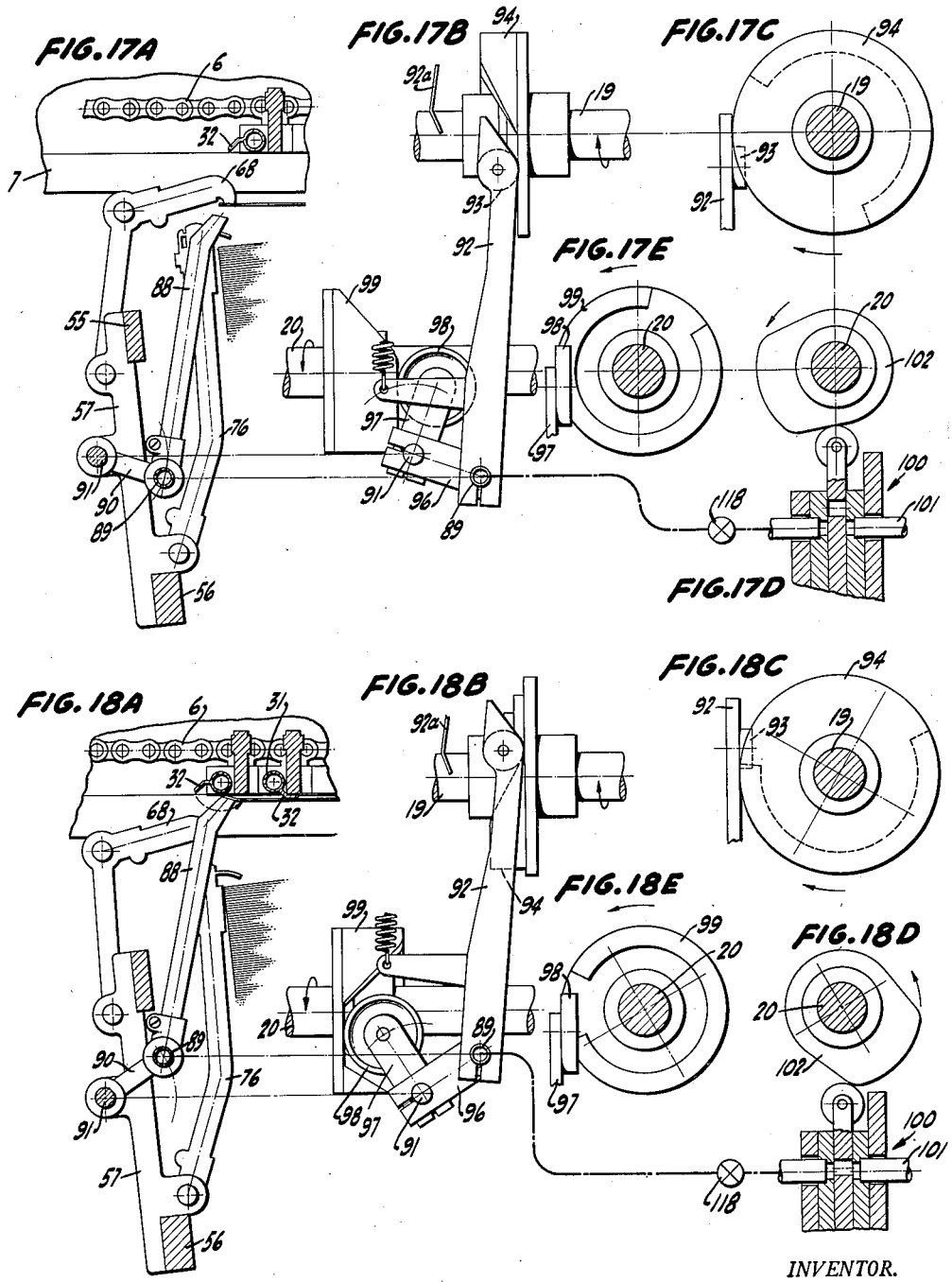

INVENTOR.
LEWIS C. PEARCE

BY

*Mellin and Hanson*

ATTORNEYS

INVENTOR.
LEWIS C. PEARCE

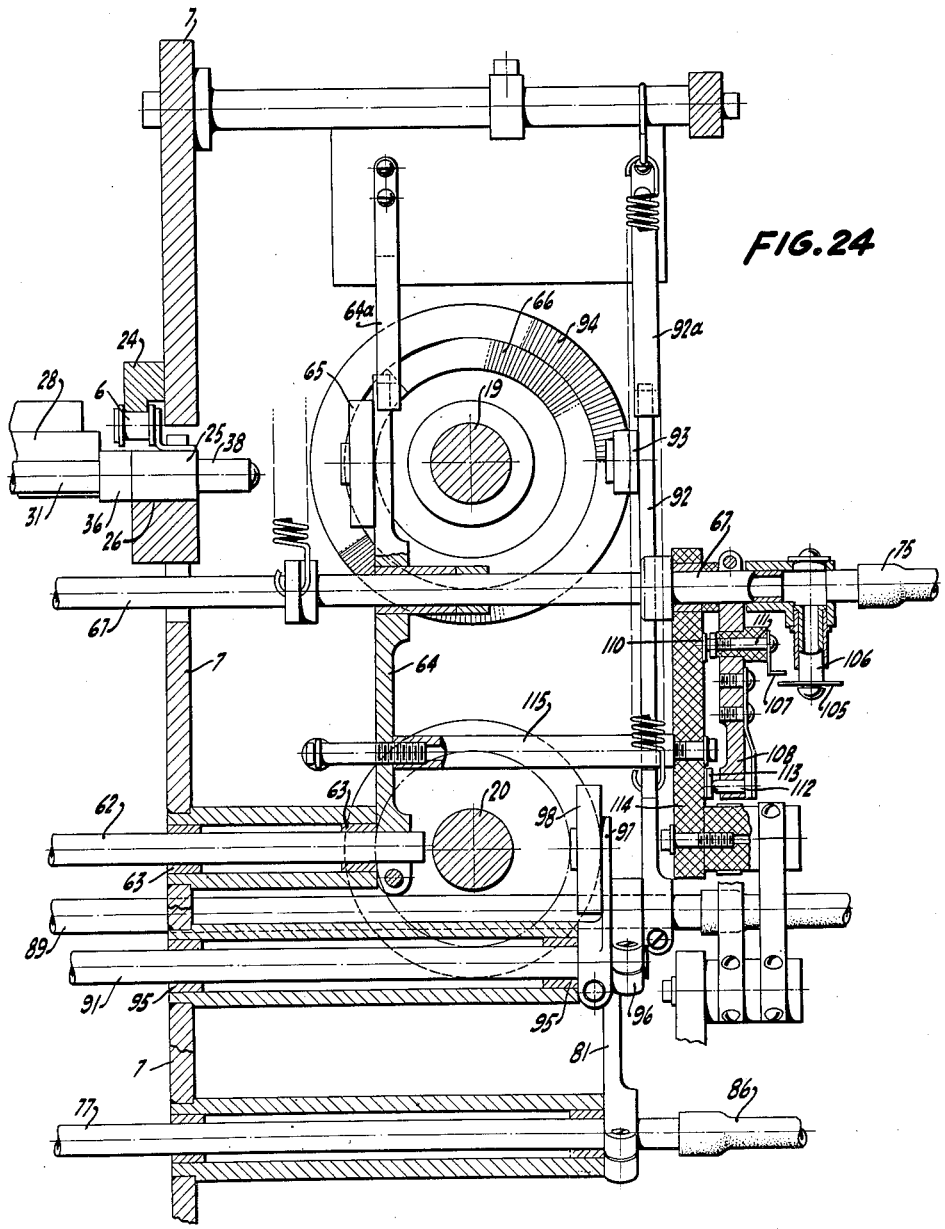

March 18, 1952 L. C. PEARCE 2,589,428
COLLATING MACHINE
Filed Oct. 10, 1950 21 Sheets-Sheet 14

INVENTOR.
LEWIS C. PEARCE
BY
Mellin and Hanscom
ATTORNEYS

March 18, 1952 L. C. PEARCE 2,589,428
COLLATING MACHINE
Filed Oct. 10, 1950 21 Sheets-Sheet 15

INVENTOR.
LEWIS C. PEARCE
BY
Mellin and Hanson
ATTORNEYS

March 18, 1952 L. C. PEARCE 2,589,428
COLLATING MACHINE
Filed Oct. 10, 1950 21 Sheets-Sheet 16
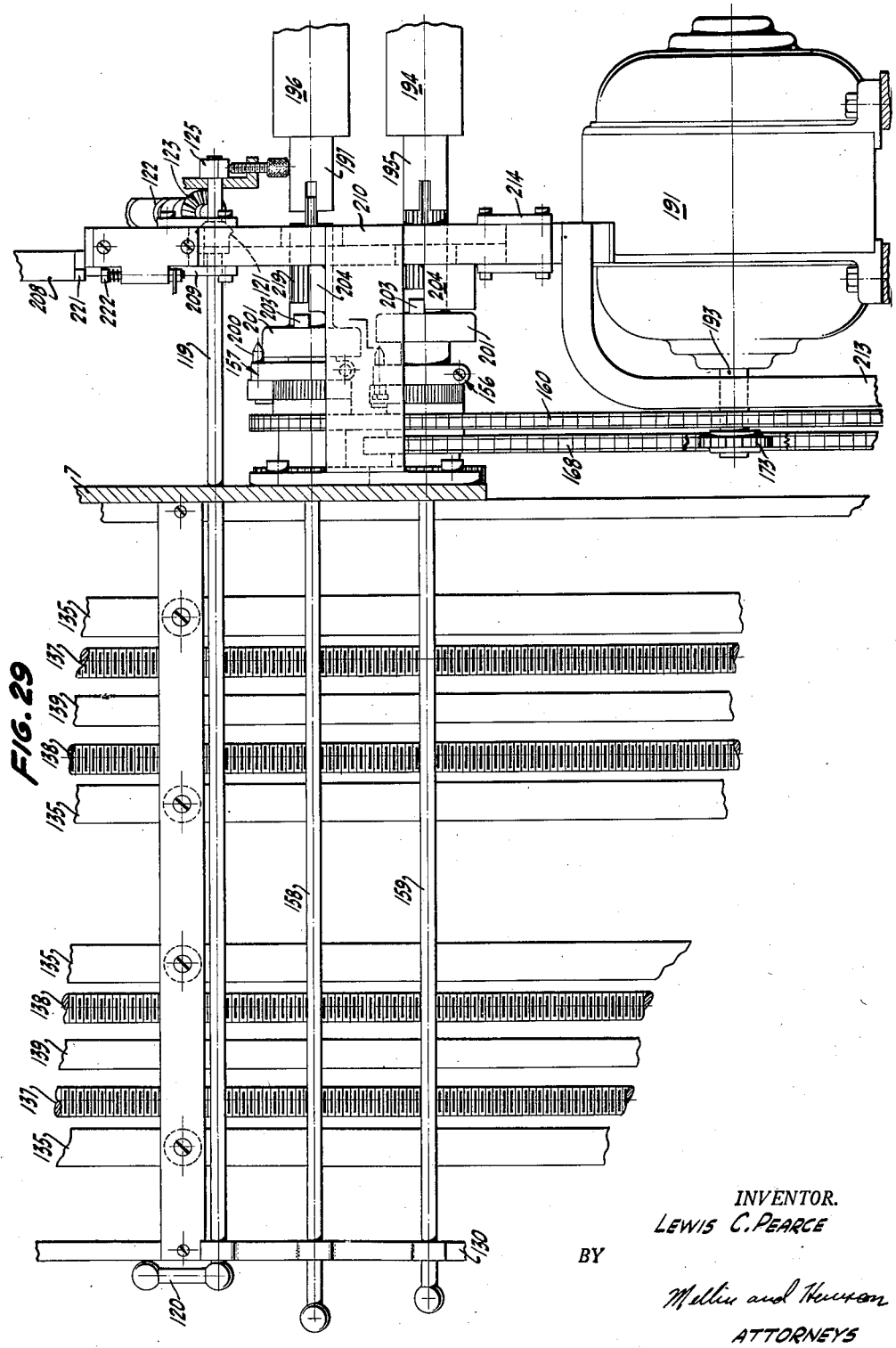
INVENTOR.
LEWIS C. PEARCE
BY
Mellin and Hensen
ATTORNEYS

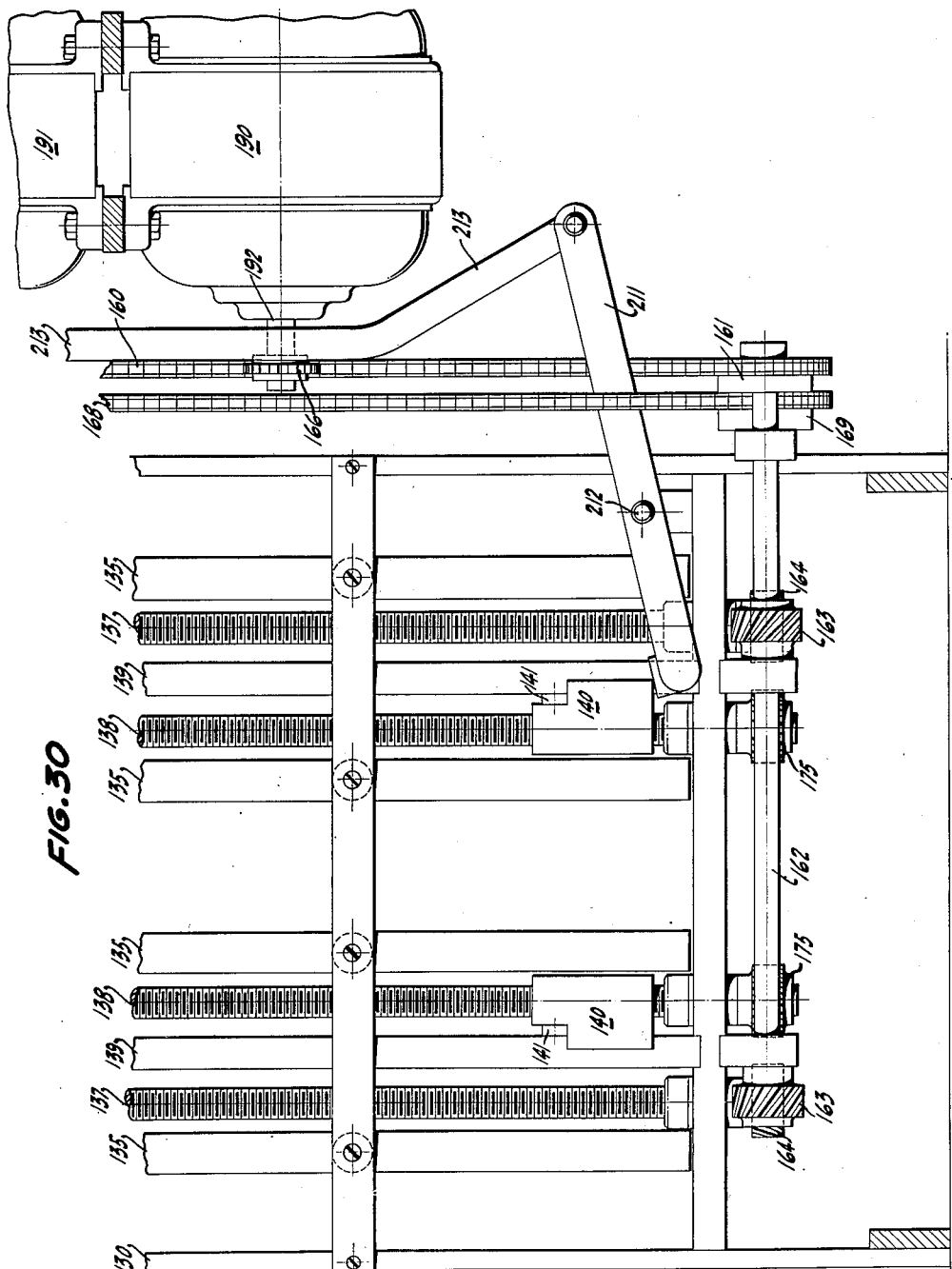

March 18, 1952 L. C. PEARCE 2,589,428
COLLATING MACHINE
Filed Oct. 10, 1950 21 Sheets-Sheet 18

INVENTOR.
LEWIS C. PEARCE
BY
Mellin and Hanscom
ATTORNEYS

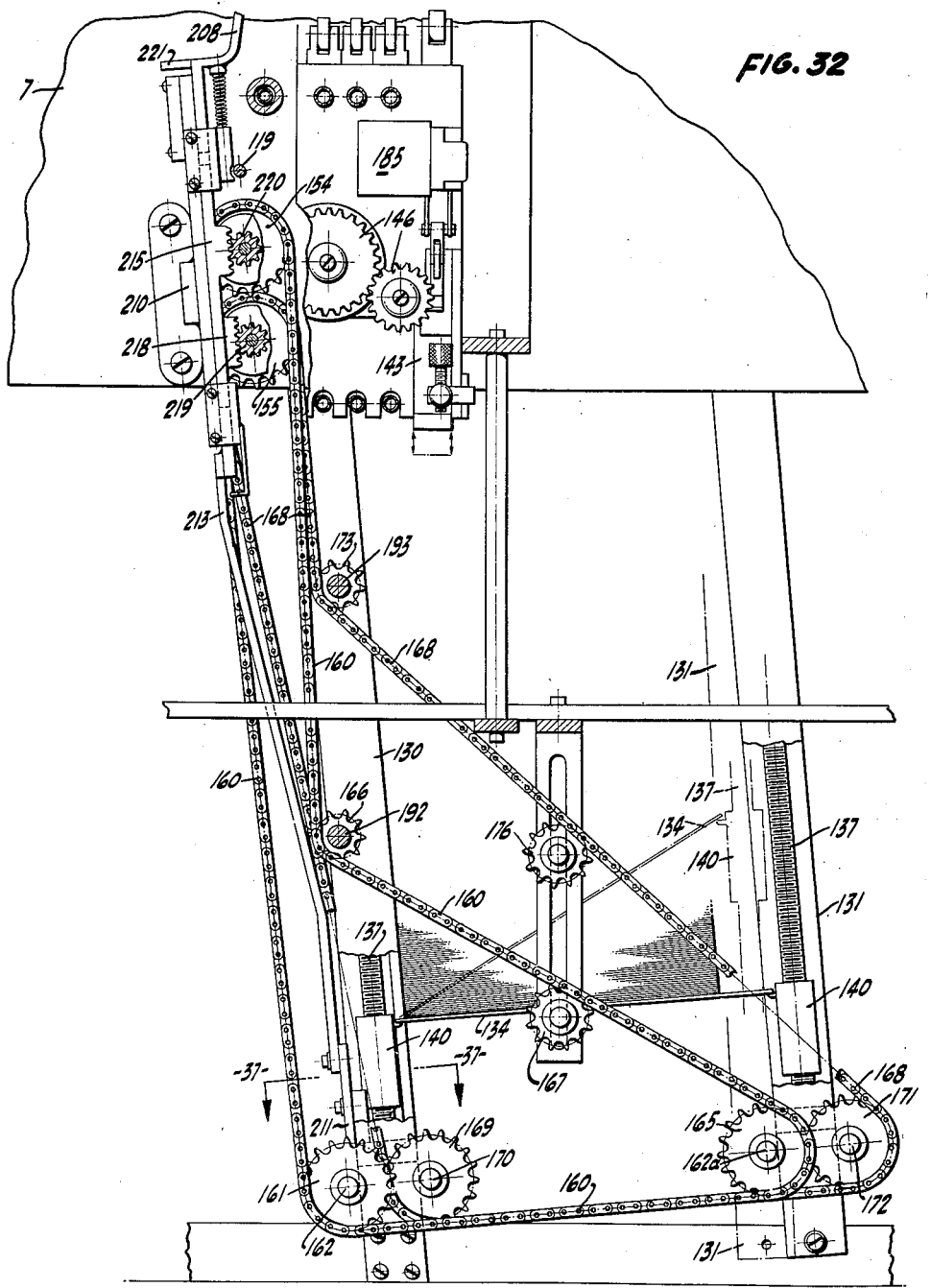

March 18, 1952 — L. C. PEARCE — 2,589,428
COLLATING MACHINE

Filed Oct. 10, 1950 — 21 Sheets-Sheet 20

INVENTOR.
LEWIS C. PEARCE
BY
Mellin and Hanscom
ATTORNEYS

March 18, 1952  L. C. PEARCE  2,589,428
COLLATING MACHINE
Filed Oct. 10, 1950  21 Sheets-Sheet 21

INVENTOR.
LEWIS C. PEARCE
BY
Mellin and Hanson
ATTORNEYS

Patented Mar. 18, 1952

2,589,428

UNITED STATES PATENT OFFICE 2,589,428

COLLATING MACHINE

Lewis C. Pearce, Berea, Ohio, assignor to Pearce Development Company, Cleveland, Ohio, a corporation Application October 10, 1950, Serial No. 189,362

36 Claims. (Cl. 270—58)

This invention relates to collating machines for assembling a plurality of different paper sheets, such as printed forms, pamphlet pages and like material from separate stacks thereof into identical groups with the different sheets in predetermined order and register.

It is a principal object of my present invention to provide a generally improved machine of the character referred to which will operate at a relatively high speed so as to be capable of accurately collating sheets or pages at a relatively low unit cost.

It is a further primary object of my invention to provide a collating machine of the character referred to which is capable of handling printed forms, pamphlet pages and like material in large volume and enabling recharging of the machine with such sheets and forms while the machine is in operation, and without the necessity of a shut-down during such recharging.

It is a further primary object of my invention to provide a collating machine of the character referred to which is capable of continuous operation, and which is provided with a sheet and form collating mechanism capable of gripping and assembling a plurality of forms in a predetermined sequence and which automatically places such forms and sheets in register, and delivers the same in registered condition while travelling continuously and uninterruptedly in a single direction at a constant speed.

It is a further object of my invention to provide a machine of the character referred to having an endless gripper carrier operating continuously and uninterruptedly at a constant speed and in a single direction relative to a plurality of separate stacks of different sheets and forms, and equipped with a set of gripper means thereon capable of automatic selective operation during the operation of the carrier to grip a sheet from each stack in succession and in predetermined sequence and relatively register the same, and deliver the registered sheets in collated and registered form during the continuous and uninterrupted operation of the gripper carrier in a single path.

It is a further object of my invention to provide a machine of the character referred to having an efficient, positively operating mechanism for conditioning the top sheet or form of a stack thereof and positioning the same for gripping by a travelling gripping means, whereby to eliminate improper collation due to failure of sheet conditioning means.

It is a further object of my invention to provide a machine of the character referred to having a relatively simple but highly efficient sheet gripping means accurately mechanically operated in precise synchronism with the sheet conditioning mechanism so as to be highly efficient and practically eliminate improper collation due to gripping failure.

It is a further object of my present invention to provide a machine of the character referred to having efficient automatic sensing means capable of immediately sensing missed feed, double sheet feed, improper collation, improper sheet stack feed and jamming, and further capable of automatic operation to visibly indicate the station where the operational failure occurred and effect immediate stopping of the machine for remedial action.

Fig. 4a is an enlarged fragmentary view in section showing the manner of closing the signalling circuit and opening the main motor drive circuit if a jam occurs at the top of a stack of a magazine.

Figure 5:
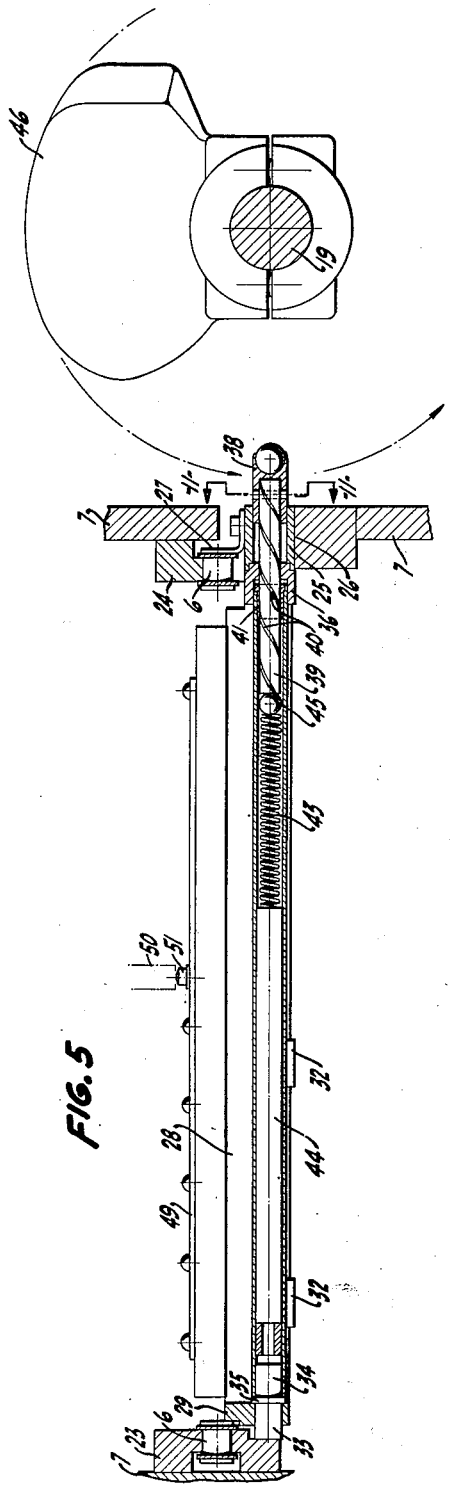
Figure 6:
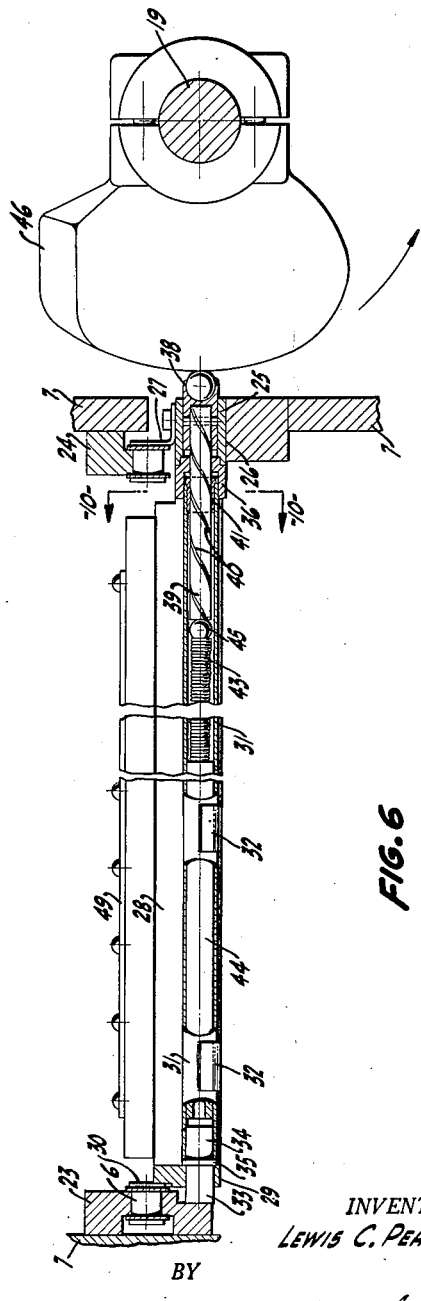

Figs. 5 and 6 are fragmentary views in transverse section through the machine and in longitudinal section through an individual gripper mechanism, both views being the same with the exception that in Fig. 5 the gripper mechanism is shown as in closed condition, and in Fig. 6 the gripper mechanism is shown as in open condition, these figures also disclosing the manner of the cam operation for opening and closing the gripper mechanism.

Fig. 7 is a fragmentary view in plan of the gripper carrier mechanism showing one complete set of gripper members.

Fig. 8 is a view in transverse section through two gripper members taken on line 8—8 of Fig. 7.

Fig. 9 is a longitudinal section through a gripper mechanism taken on line 9—9 of Fig. 7.

3

Fig. 10 is a transverse section through a gripper mechanism taken on line 10—10 of Fig. 6.

Fig. 11 is a transverse sectional view through a gripper mechanism taken on line 11—11 of Fig. 5.

Fig. 12 is an electrical diagram showing the electrical sensing means for visually indicating failure of the machine at one of the stations.

Figs. 13a to 13e, inclusive, are fragmentary views of the pick-up, separating and transfer mechanisms together with the operating mechanism associated with the pick-up mechanism for operating the same through its cycle of operation, showing the parts in their normal position which they assume immediately prior to the commencement of those operations.

Figs. 14a to 14b, inclusive, are views similar to those shown in 13a to 13d, inclusive, save and except that the parts are shown in the condition which they assume when one-half of the operating cycle of the pick-up, separating and transfer mechanisms operation has been completed.

Figs. 15a to 15d, inclusive, are views similar to Figs. 14a to 14d, inclusive, except the parts have assumed the positions which they assume after two-thirds of the cycle of operation of the pick-up, separating and transfer mechanisms.

Figs. 16a to 16e, inclusive, are fragmentary views of the pick-up, separating and transfer mechanisms together with the operating mechanism associated with the transfer mechanism for operating the same through the cycle of operation, showing the parts in their normal position which they assume immediately prior to the commencement of those operations.

Figs. 17a to 17e, inclusive, are views similar to those shown in 16a to 16e, inclusive, save and except that the parts are shown in the condition which they assume when one-half of the operating cycle of the pick-up, separating and transfer mechanisms operation has been completed.

Figs. 18a to 18e, inclusive are views similar to Figs. 17a to 17e, inclusive, except that they show the parts in the position which they assume after the cam mechanisms have traveled through 300 degrees of their 360 degree cycle of operation.

Figure 19A:
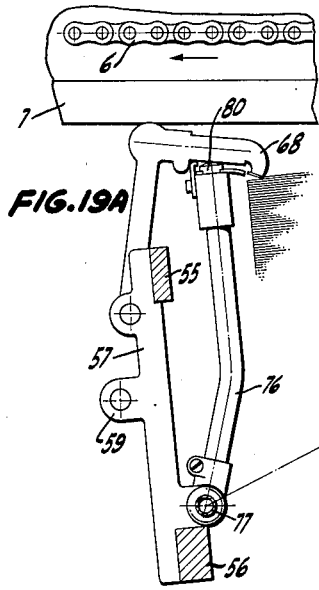
Figure 19B:
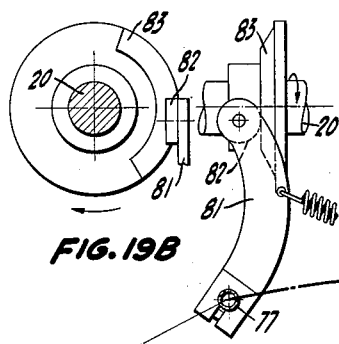
Figure 19C:
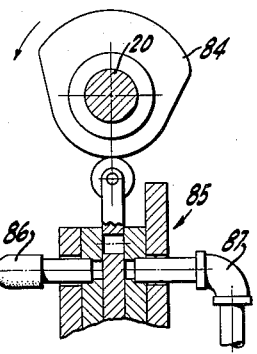

Figs. 19a to 19c, inclusive, are fragmentary views of the pick-up, separating and transfer mechanisms together with the operating mechanism associated with the separating mechanism for operating the same through its cycle of operation, showing the parts in their normal position which they assume immediately prior to the commencement of those operations.

Figure 20A:
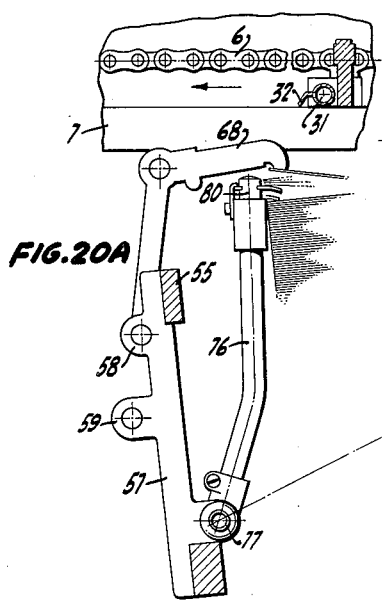
Figure 20B:
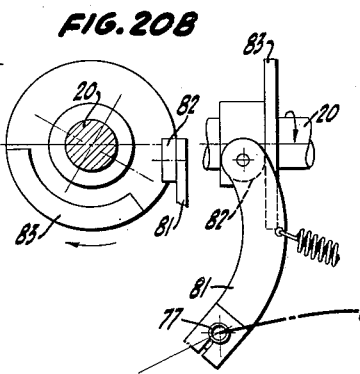
Figure 20C:
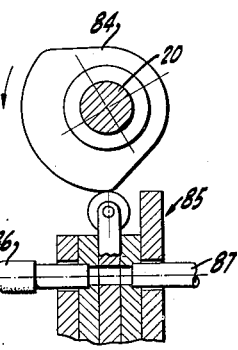

Figs. 20a to 20c, inclusive, are views similar to Figs. 19a to 19d, inclusive, except that they show the parts in the position which they assume after the cam mechanisms have travelled through 120 degrees of their 360 degree cycle of operation.

Figure 21:
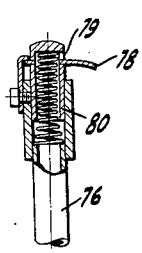

Fig. 21 is a fragmentary view in section through the nozzle end of the sheet separating nozzle.

Figure 22:
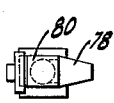

Fig. 22 is a top end view thereof.

Figure 23:
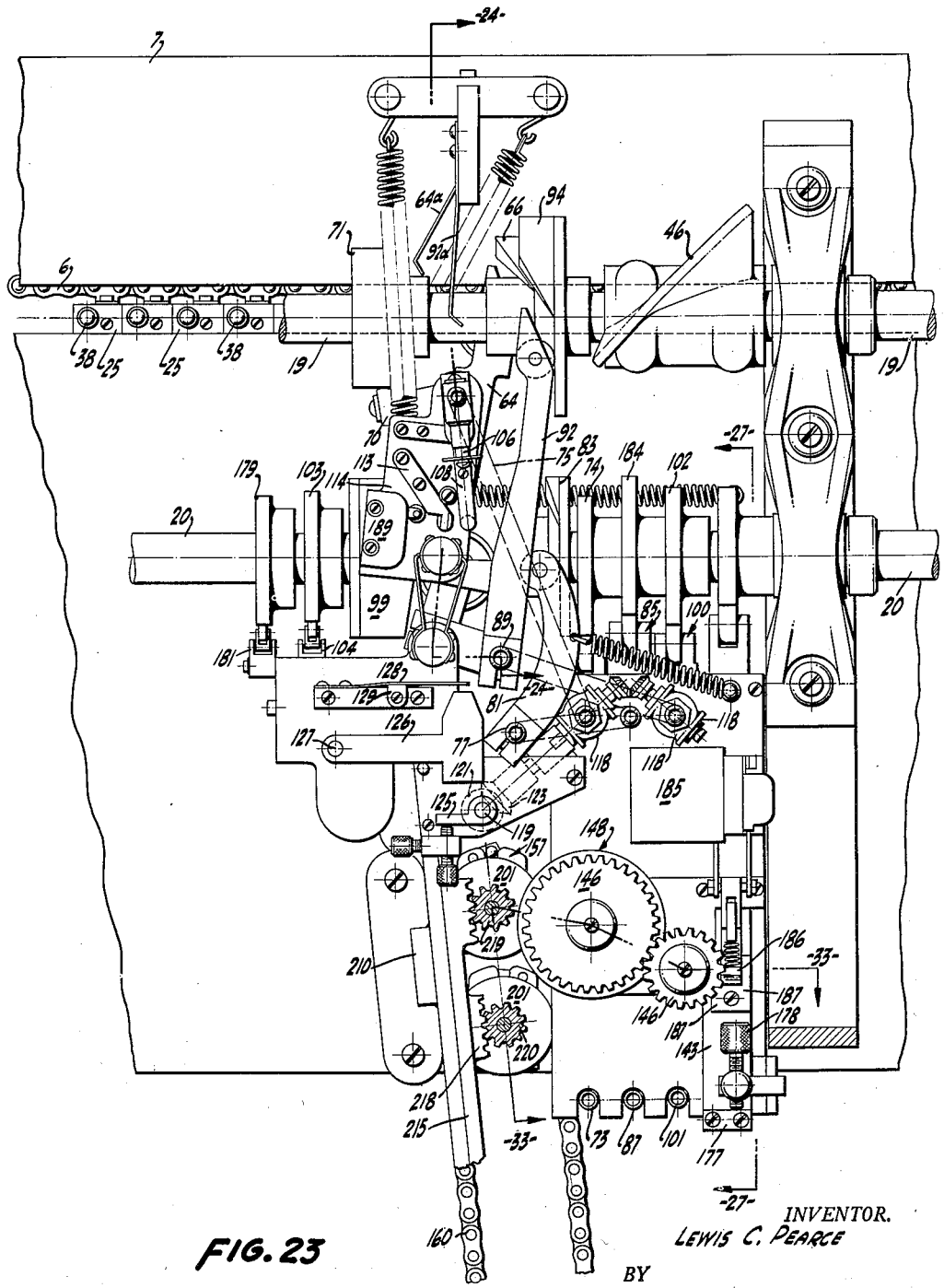

Fig. 23 is a fragmentary view in side elevation of the cam side of the machine showing the operating mechanism at each station for operating the pick-up, sheet separating and sheet transfer mechanisms as well as the mechanism for controlling the operation of the elevating and adjusting mechanism for the sheet stacks at each station.

Fig. 24 is a fragmentary view in vertical section taken on line 24—24 of Fig. 23, and disclosing the arrangement of the various operating shafts, both tubular and solid, of the pick-up, separating and transfer mechanisms.

Fig. 25 is a fragmentary view showing the man-

4 ner of sensing if two sheets are picked up and separated from the stack instead of one.

Figure 26:
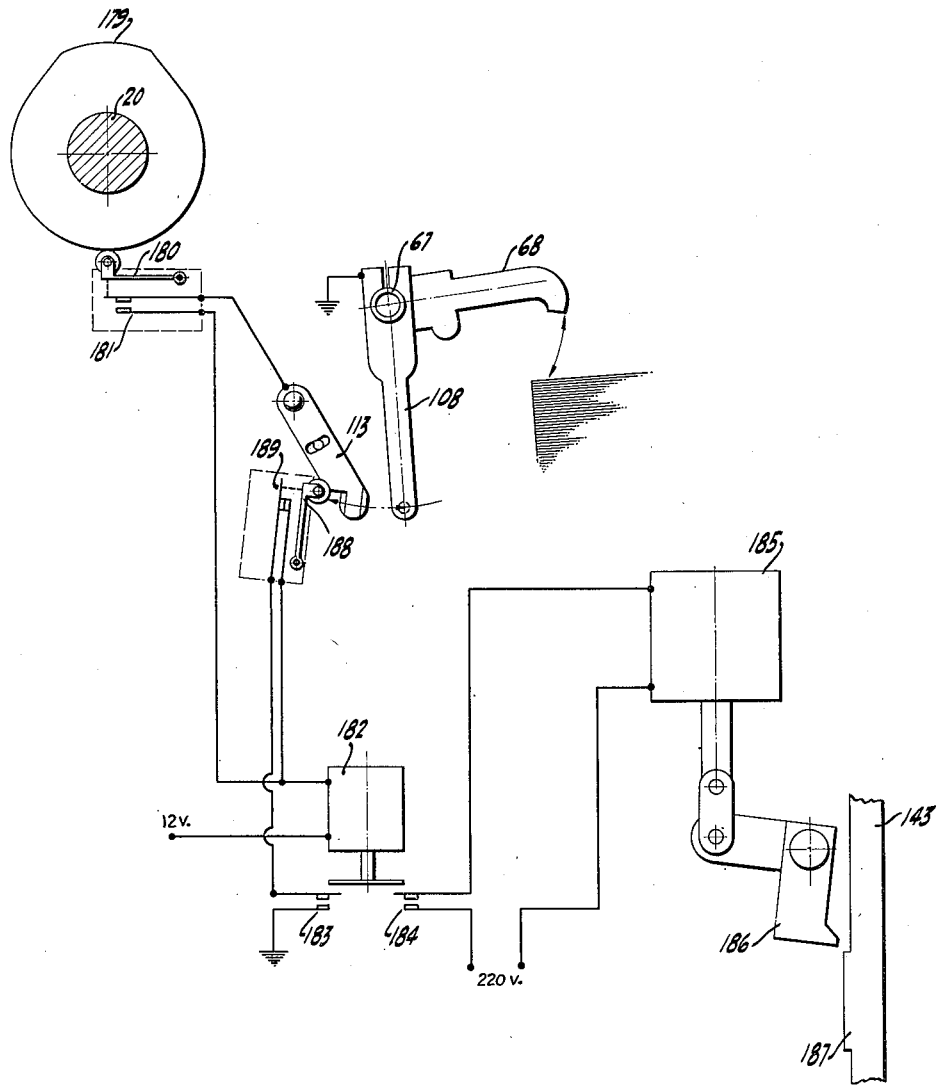

Fig. 26 is a diagrammatic view showing the paper height sensing means and the electrical circuit in conjunction therewith.

Figure 27:
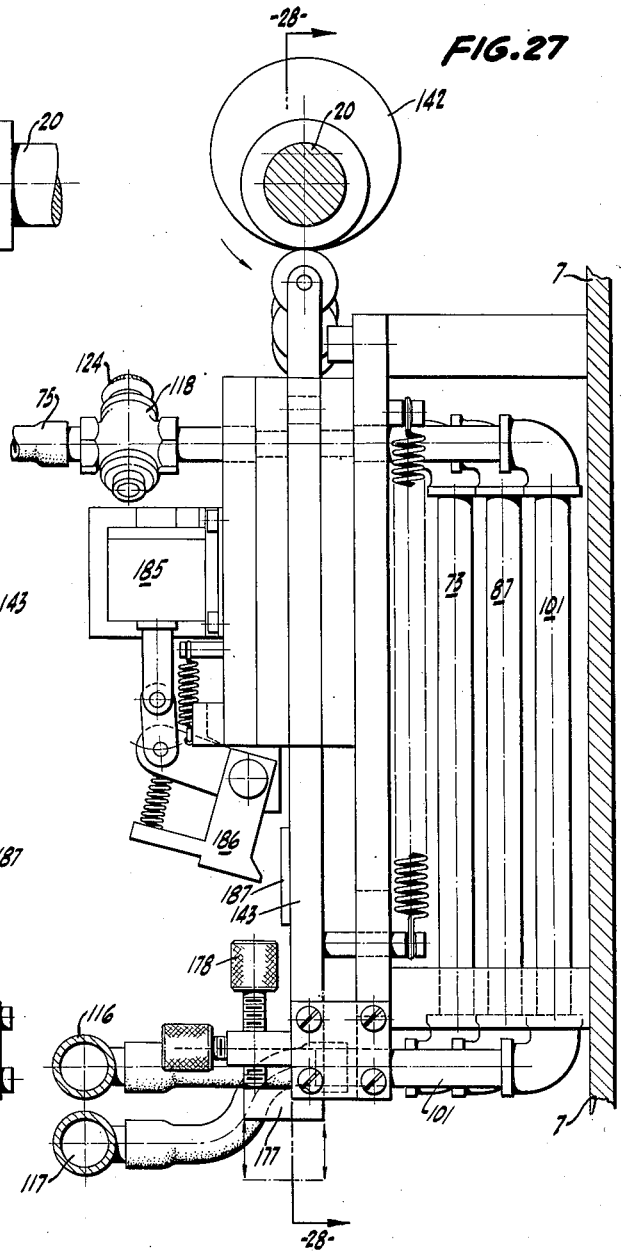

Fig. 27 is a fragmentary view in transverse section taken on line 27—27 of Fig. 23, and disclosing certain features of the vacuum and air pressure control valves as well as certain features of the automatic elevator feed control.

Figure 28:
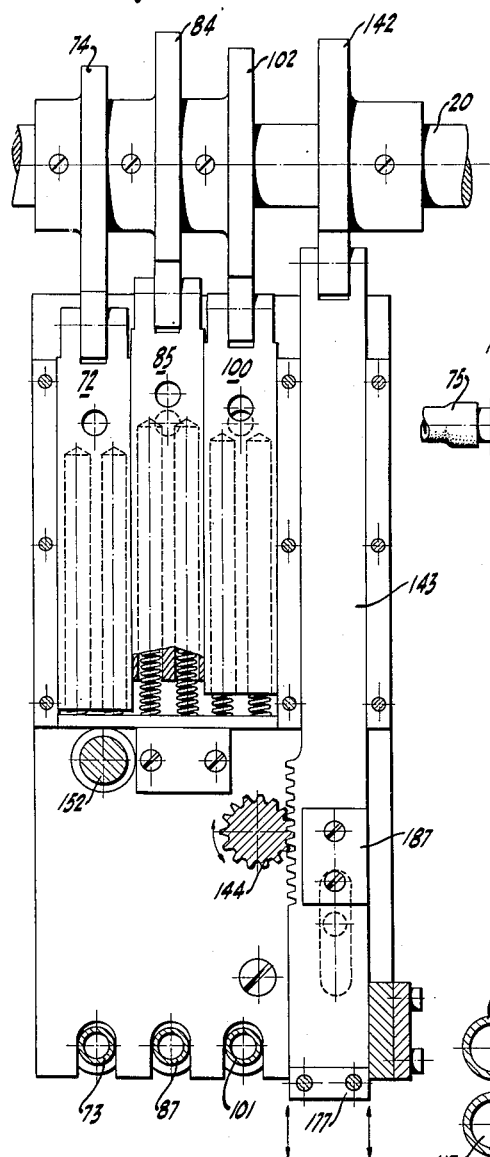

Fig. 28 is a fragmentary view of the same mechanism and partly in section and taken at right angles to the view in Fig. 27, the section being along lines 28—28 of Fig. 27.

Fig. 29 is a fragmentary view in vertical transverse section through the machine at an elevation just below that illustrated by Fig. 4 and taken on line 29—29 of Fig. 3.

Fig. 30 is a view in transverse section taken at an elevation just below that illustrated in Fig. 29 and taken on the line 30—30 of Fig. 3.

Figure 31:
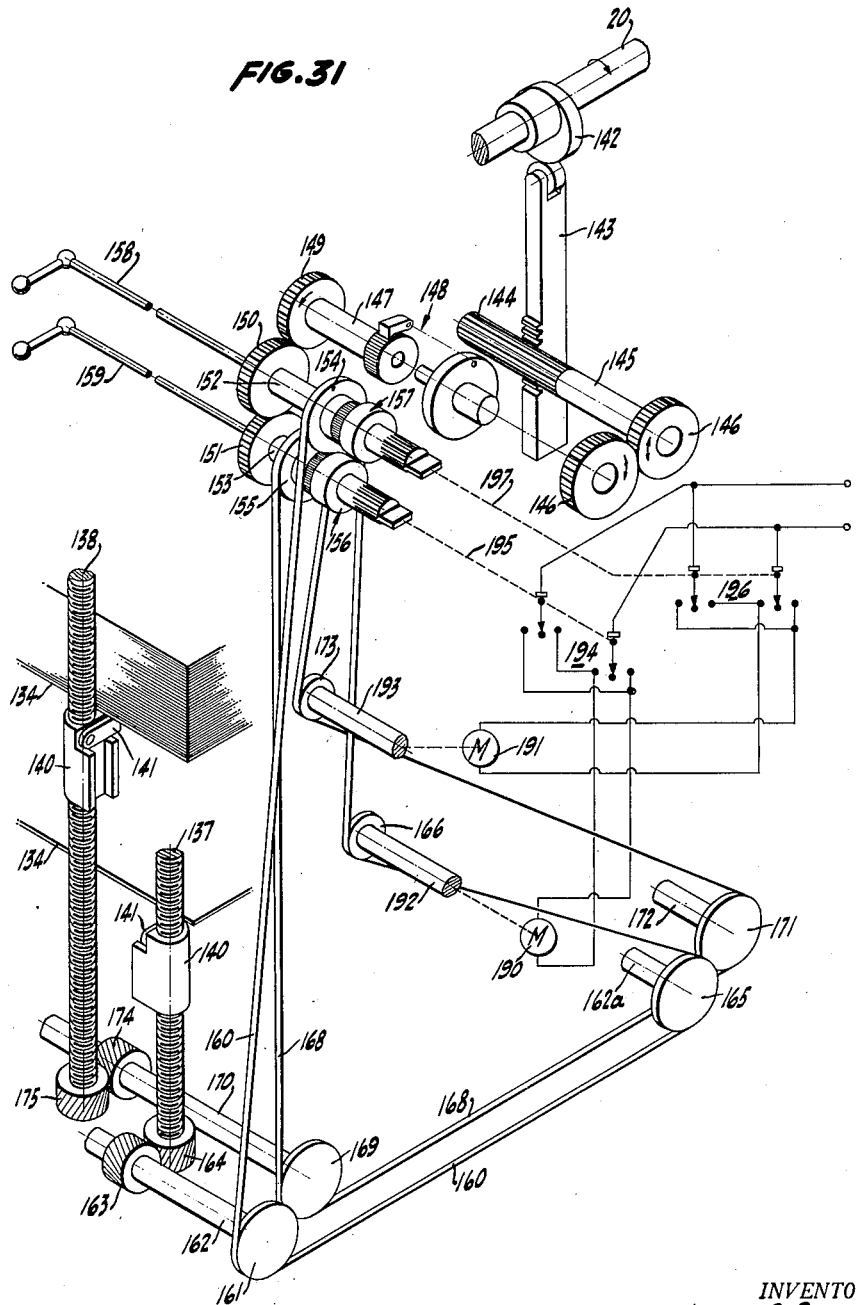

Fig. 31 is a schematic and diagrammatic view illustrating the stack feeding and elevating drive mechanism, both manual and automatic.

Fig. 32 is a fragmentary view in side elevation taken at one station of the machine and showing certain features of the drive mechanism for feeding and elevating the stack.

Figure 33:
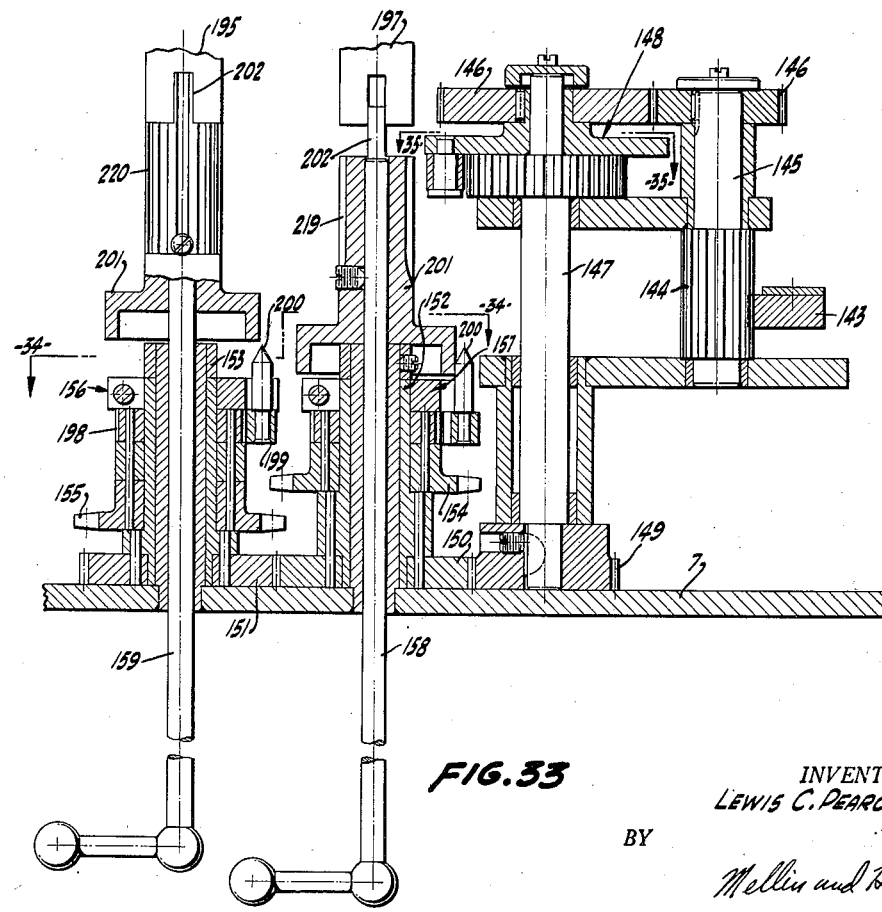

Fig. 33 is a fragmentary view in section through certain of the gear and clutch mechanism incorporated in the stack feeding and elevating drive, the view taken on line 33—33 of Fig. 23.

Figure 34:
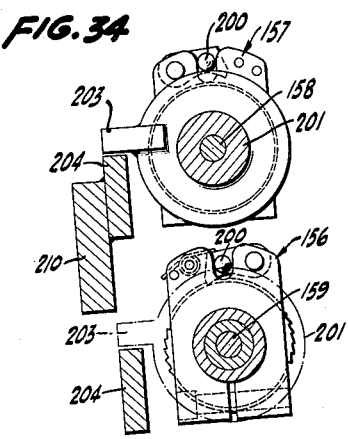

Fig. 34 is a view in transverse section through the clutch mechanism incorporated in the drive of the stack feeding and elevating mechanism, and taken on line 34—34 of Fig. 33.

Figure 35:
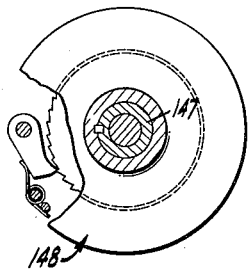

Fig. 35 is a view in transverse section with parts thereof broken away to show the one-way clutch mechanism illustrated in Fig. 33, and is taken on line 35—35 of Fig. 33.

Figure 36:
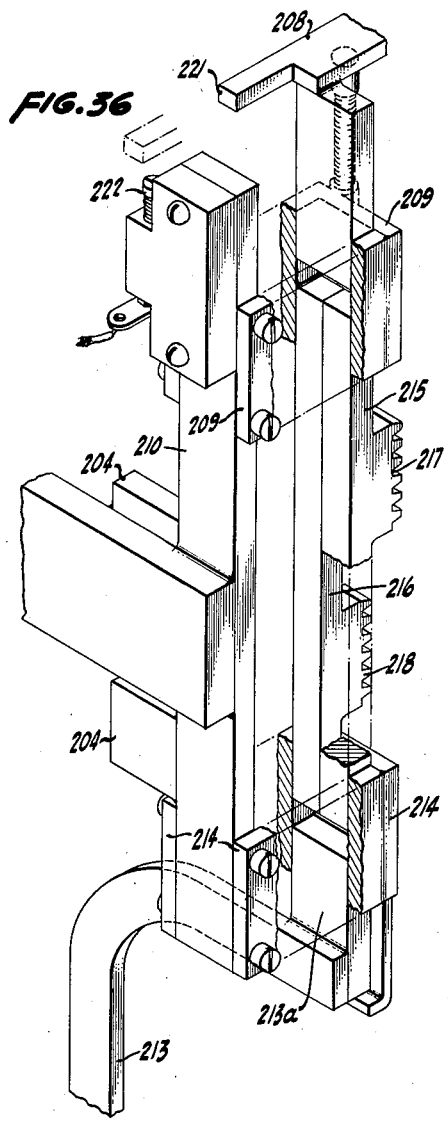

Fig. 36 is an exploded view in perspective illustrating a portion of the control mechanism for opening motor circuits at the upper and lower ends of the travel of the elevators.

Figure 37:
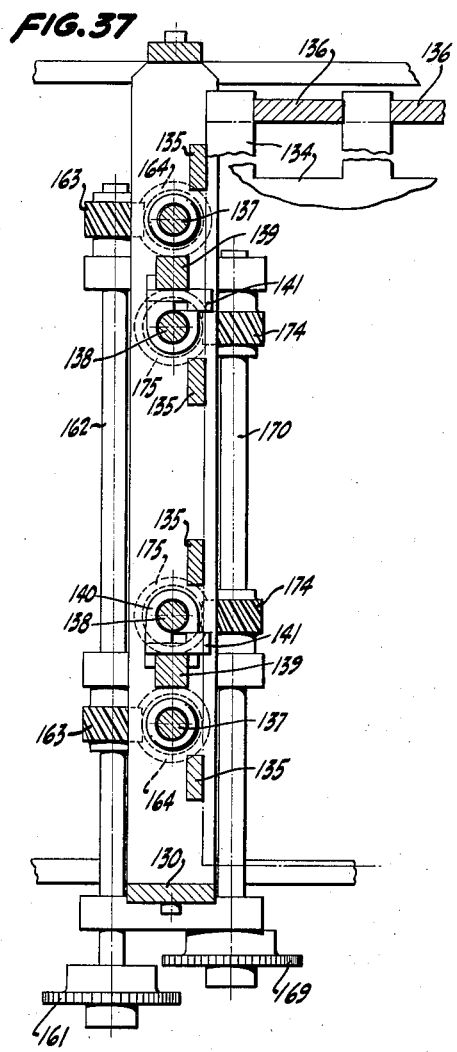

Fig. 37 is a fragmentary view in plan section taken on line 37—37 of Fig. 32.

*In general*

The collating machine embodying my invention as disclosed herein contemplates the provision of a plurality of stations at each of which is located a stacked supply of pages or paper sheets to be collected. These stations are labeled in Fig. 1 of the drawings as stations numbers 1, 2, 3 and 4. In the present instance I have illustrated the machine as including four of such stations, but it is to be understood, however, that this number may be such as desired and may be greater or lesser than four. Regardless of the number of the stations, the machine, except for length, remains the same in the principal aspects of its construction and mode of operation.

At each of the stations 1, 2, 3 and 4 is located a stack feeding mechanism to be loaded with a stack of paper sheets. These stacks are automatically fed by the feeding mechanisms to properly position the uppermost sheet on the stacks so that the uppermost sheet of each may be removed sequentially and simultaneously collated and then delivered in superimposed collated relationship at the delivery end of the machine.

The stations 1, 2, 3 and 4 are arranged in line formation longitudinally of the machine.

Figure 1:
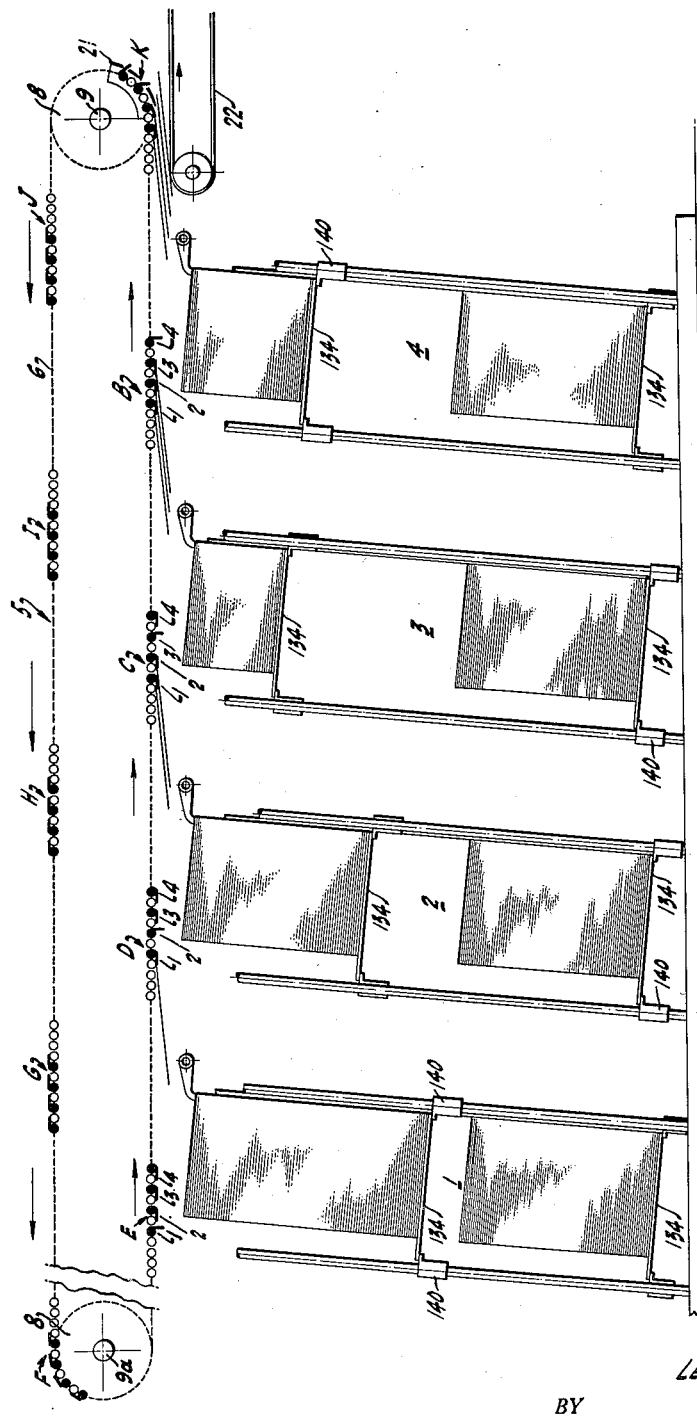
Fig. 1 is a schematic view in side elevation showing the four stations at which are located the stacked supply of papers or paper sheets, and graphically illustrating the manner of collating the sheets by the present machine.
Figure 2:
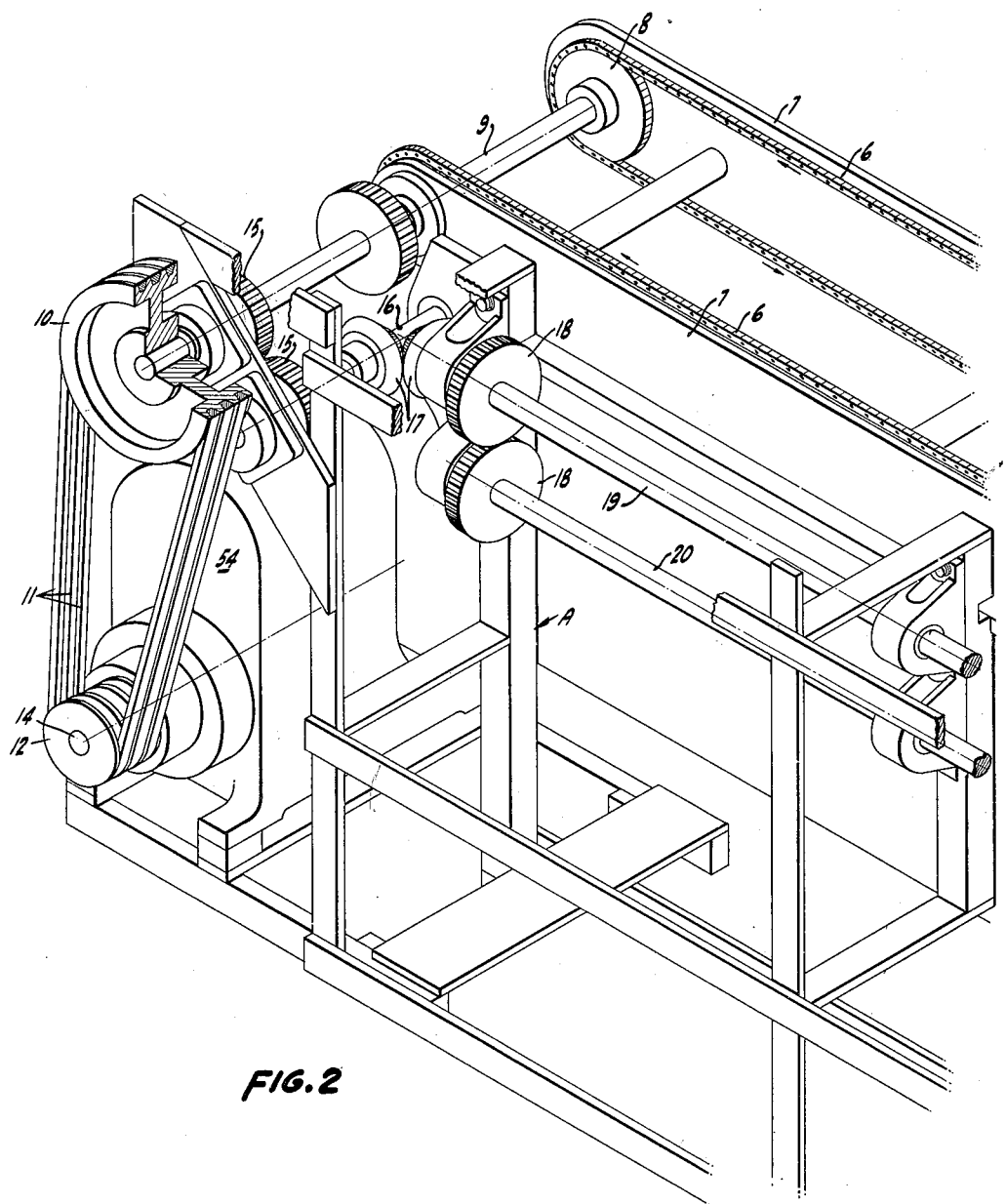
Fig. 2 is a fragmentary view in perspective showing the main drive mechanism of the machine and the manner of its connection with the cam shafts of the machine and with the gripper carrying mechanism of the machine.

Overlying the stack feeding mechanisms and the stacks of paper sheets therein and extending longitudinally of the machine in proper vertical register with the stacks of paper sheets at the stations 1, 2, 3 and 4 is a gripper carrier indicated in Fig. 1 by the numeral 5. This gripper carrier includes two endless sprocket chains 6 disposed in a vertical plane and in parallelism at a spaced distance apart, as illustrated in Fig. 2 of the drawings.

By reference to this figure, it will be seen that the endless chains 6 are each arranged at the interior sides of side frame members 7 which form a fixed part of the structural rigid frame of the machine. The endless chains 6 of the carrier 5 engage sprockets 8 fixed on a transverse horizontal drive shaft 9 suitably journalled in the frame members 7. This drive shaft 9 is fitted with a fixed pulley 10 connected by V-belts 11 to a drive pulley 12 on a motor driven shaft 14. Obviously, the drive shaft 14 may be driven to result in the proper speed for the machine, which speed will depend to some measure upon its size, the product being handled and the output or capacity desired.

Also driven from the shaft 9 through a gear train, including spur gears 15, an idler shaft 16, miter gears 17 and spur gears 18, is a first cam shaft 19 and a second cam shaft 20. These cams shafts are suitably journalled on the structural frame A of the machine, of which the frame members 7 heretofore referred to are an integral part.

Figure 3:
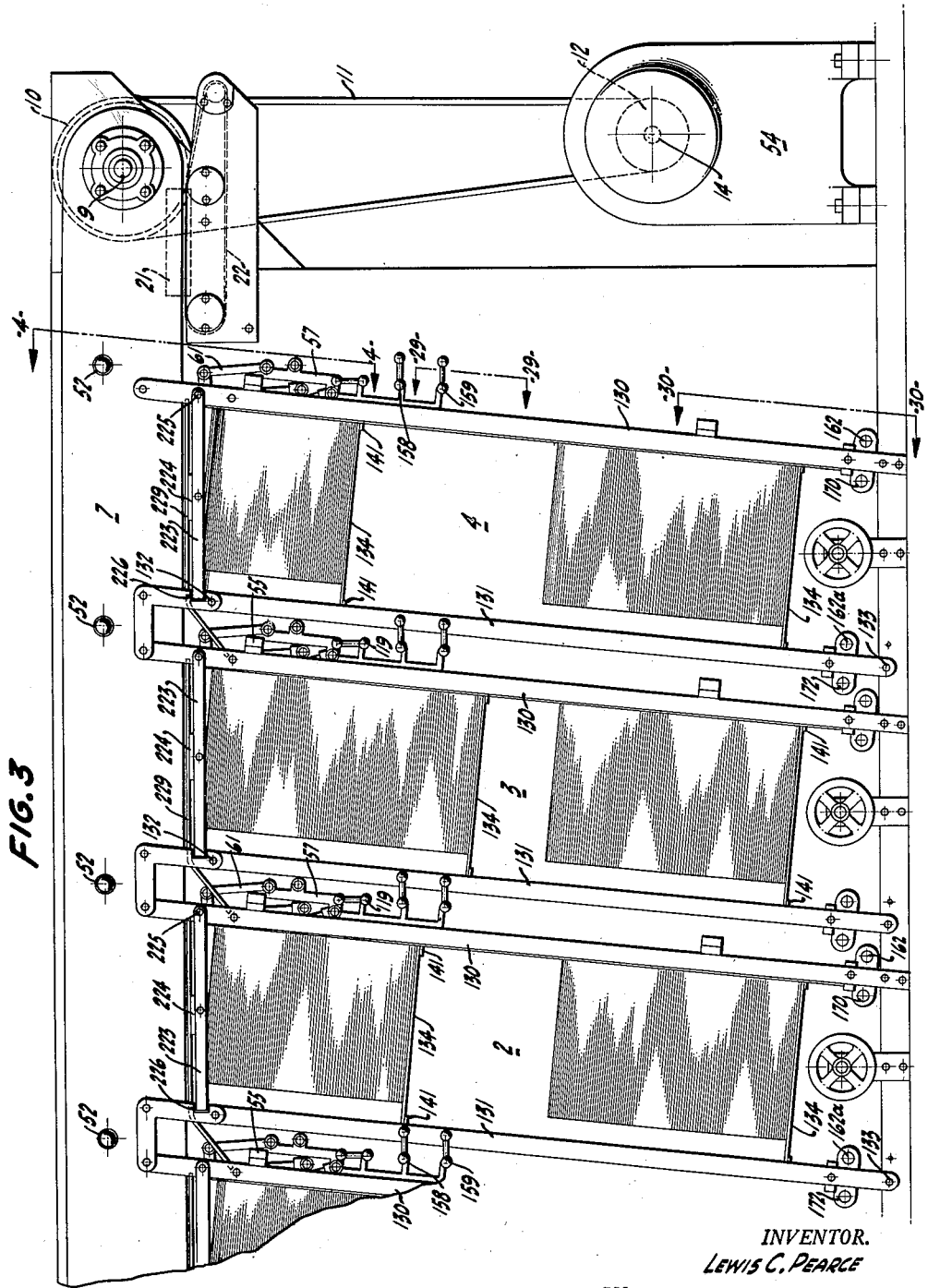
Fig. 3 is a view in side elevation of the machine with a part thereof broken away showing that side of the machine which is opposite the cam shaft side, which will be termed herein as the work side of the machine as distinguished from the cam shaft side of the machine.

It should be stated that the driving of the machine is located at the delivery end of the machine as illustrated in Fig. 3 of the drawings.

At the end of the machine opposite its drive end there is a horizontal transverse idler shaft 9a which is in horizontal alignment with the shaft 9 with its axis in parallelism therewith. The idler shaft 9a is fitted with sprockets complementary to the sprockets 8 on the shaft 9 and are similarly engaged with the endless sprocket chains 6 for obvious reasons.

Through the medium of the mechanism heretofore described, when the drive shaft 14 is placed in operation, the chains 6 of the gripper carrier 5 will be driven at the same desired speed in the same direction, and the direction of the drive is such that the bottom flights of the endless chains 6 will travel toward the delivery end of the machine, as illustrated in Fig. 1.

The gripper carrier 5 also includes a plurality of sets of sheet or page grippers B to K, inclusive, as shown in Fig. 1. Each set comprises a number of grippers corresponding to the number of stations 1 to 4, to-wit 4. The number of sets B to K of grippers and the relative spacing thereof on the carrier 5 is such as to enable continuous operation of the carrier mechanism at a constant speed. The spacing of the sets B to K, inclusive, on the gripper carrier 5 and the synchronous operation of the grippers thereof is such as to enable the top sheet on each of the four stacks to be removed during one cycle of operation of the auxiliary mechanism and each by one of the grippers of four different successive sets of the gripper members.

To graphically illustrate this, reference is had to Fig. 1 of the drawings where it will be seen that the gripper labeled 1 of set E is conditioned to grip and remove the topmost sheet from station 1. The gripper 2 of the gripper set D is conditioned to grip and remove the topmost sheet from station 2 and the gripper 3 of the set C is conditioned to grip and remove the topmost sheet from station 3, and the gripper 4 of the set B is conditioned to grip and remove the topmost sheet from station 4. Thus, it will be seen that as each set traverses the stations 1, 2, and 3, as has the set E, its grippers 1, 2 and 3 will have successively gripped and conveyed a sheet from stations 1, 2 and 3 and as the set E traverses over station 4, its gripper 4 will grip the topmost sheet thereof and then convey the thus collated sheets in shingled superimposed relationship to the delivery end of the machine.

The synchronous drive of the gripper carrier and the page or paper sheet conditioning mechanism associated with the grippers (all operated in synchronism by the cam shafts) is such that there is a sufficient time interval permitted between successive gripping operations at each station to enable the sheet conditioning mechanism thereat to properly condition a sheet for gripping, as will be hereinafter described. It should be pointed out that the operation of the grippers in gripping a sheet and the operation of the sheet conditioning mechanism essential to present and position a sheet for gripipng at each station requires one revolution of the cam shafts, and that is what has been meant heretofore by the term "cycle of operation of the cam shafts."

When each set of grippers moves from the station 4 to the delivery end of the machine, it has gripped and collated sheets from the four stations in superimposed shingled relationship, as is illustrated in Fig. 1, and as the grippers pass a releasing station (which is just prior to the point at which the straight line bottom flight of the chains terminates and the chains commence to climb on the sprockets), the grippers are automatically opened by a stationary cam 21 to release the sheets. At this time the sheets overlie a moving conveyor 22, the upper flight of which is travelling in the same direction and at approximately the same speed as the lower flight of the chains 6, so that the collated set of superposed sheets delivered by the grippers will be deposited upon the conveyor 22 in approximately the same shingled relationship that they were assembled in by the gripper sets. From this point the sheets may be glued and padded and other operations may be performed thereon such as desired, it being the ultimate purpose of the present machine to collate sheets from the four stations and deliver them in collated condition to the conveyor 22 in shingled or padded relationship as described.

*Gripper mechanism and operation*

The gripper mechanism heretofore referred to is most clearly illustrated in Figs. 4 to 11, inclusive, of the drawings. In Fig. 7 I have shown a fragmentary view in plan of one complete set of gripper mechanisms such as those B to K, inclusive. In the present instance, each set comprises four individual gripper or gripper units which are self-contained and separately and individually operated, and each of them is fixed to the endless chains 6 constituting the endless gripper carrier. It should be pointed out that during the course of its lower flight, the endless chain 6 at the working side of the machine, which is opposite from the cam side, is guided in a trackway 23, as illustrated most clearly in Fig. 4. At the opposite or cam side of the machine, the outer endless chain 6 is guided by an upper track member 24, and because it is rigidly connected with the gripper units it is also guided by flat guide blocks 25, each of which forms a fixed part of an individual gripper member.

The flat guide blocks 25 are best illustrated in Figs. 7, 8 and 9, which disclose that the guide blocks 25 are each rectangular in form with its bottom flat face riding on a straight horizontal flat face 26 of the frame member 7. These guide blocks 25 are each rigidly fixed to a rigid rightangular extension 27 formed as an integral part of one of the links of the chain 6. The guide blocks 25, in addition to serving the function of guiding the chain 6 and the grippers in a straight horizontal path longitudinally of the machine in accurate vertical relationship to the paper stacks in the machine, likewise serve the function of preventing partial rotation or turning movement of a non-rotating portion of each gripper unit.

By reference to Figs. 8 and 9, it will be seen that each gripper includes an elongated housing 28 which is hollow and rectangular in cross-section. The housing 28 is fixed at one end to the guide block 25 and extends transversely and horizontally of the machine and fixed at its opposite end to a block 29 which corresponds somewhat in configuration with the block 25. The block 28 is secured to a rigid depending bracket 30 formed as an integral part of one of the links of the contiguous carrier chain 6.

Mounted in parallelism with the fixed housing 28 at one side thereof, which, when the gripper mechanism is in the lower flight of the carrier chain 6 is toward the delivery end of the machine, is a rotating gripper tube 31 having two fixed and somewhat tangentially extending gripper fingers 32 thereon. As illustrated in Fig. 8, the gripper tube is adapted to rotate the gripper fingers 32 from a closed or gripping position underlying the housing portion 28 in which they grip or clamp a page or a sheet of paper between them and the underside of said housing, to a withdrawn or open position in which the gripping fingers 32 are positioned at a point approximately above the plane of the bottom of the housing 28. In this position, the fingers 32 do not obstruct the operations of the paper pick-up separating and transfer mechanisms which occur during the period that the gripper fingers 32 are in open position for the purpose of conditioning the paper sheet so that it may be gripped as heretofore specified upon the movement of the gripper fingers 32 to closed position.

For the purpose of actuating or rotating the gripper tube 31 to operate the gripper fingers 32, the tube 31 is constructed and rotatably mounted with respect to the blocks 25 and 29, as clearly illustrated in Figs. 5 and 6. Reference being had to those figures, it will be seen that the block 29 forming part of each gripper is provided with a collared trunnion 33, upon the inner end 34 of which the tube 31 is rotatable. The end of the tube 31 abuts against the collar 35 of the trunnion 33 which in turn abuts against the block 29. The outermost extremity of the trunnion 33 is enabled to abut against the inner face of the fixed track 23 of the adjacent carrier chain 6, so as to take any endwise thrust which is applied to the tube during the rotation thereof, as will be described.

At its opposite end, the tube is fixed in a bushing 36 which is rotatable in the guide block 25. This block 25 is broached to form a square socket 37 (see Fig. 11) which reciprocably receives an actuator 38 which is square in external configuration to reciprocably fit the socket 37. Projecting into and secured to the actuator 38 is an elongated cylindrical plunger 39 having a pair of external helical grooves 40 formed therein of steep pitch.

As shown in Figs. 6, 10 and 11, the gripper tube 31 is formed with a key member 41 having keys 42 engaging the double helical grooves 40 of the plunger 39.

As shown in Fig. 5, the actuator 38 and its fixed grooved plunger 39, which are non-rotatable due to the square engagement between the exterior of the actuator 38 and the square socket 37 in the block 25, are normally in a position projected a distance outwardly beyond the block 25 and normally maintained in such positions by means of spring-pressed mechanism within the tube. This retractor includes an expansion spring 43, a spacer 44 and a ball 45. In this position the key engagement between the tube 31 and the plunger 39 is such that the tube is constantly spring-urged to place the grippers in closed position as previously discussed in connection with Fig. 8. However, when the actuator 38 is moved inwardly to a predetermined position, the turning movement imparted to the tube 31 through the medium of the keys 42 and their engagement with the grooves 40 of the plunger 39 is sufficient to position the gripping fingers 32 in their wide open position, as also illustrated in Fig. 8, at which point they do not obstruct the conditioning of a sheet of paper relative to such fingers 32 and to the housing 28 to enable the fingers to subsequently grip or clamp such paper tightly to the bottom of the housing 28 upon subsequent movement of the fingers 32 to closed position.

For moving the actuator 38 inwardly to a position opening the gripper, there is provided at the cam side of the machine a gripper actuating cam 46 for each station. These cams are fixed on the cam shaft 19 and they are of the helical type. The cams 46 are so configurated and so timed that they selectively open but one gripper of each set as it comes into proper operating position relative to the sheet to be gripped at that station and to permit closing of the fingers at the proper time to grip the sheet so described. For example, at station 1 the associated cam 46 actuates to open (referring to Fig. 1) gripper 1 of gripper set E. At the second station the associated cam 46 opens the gripper 2 of the gripper set D. At the third station the associated cam 46 operates to open gripper 3 of set C and at the fourth station it operates to open gripper 4 of set B. The timing of each cam is such that it opens the selected gripper in synchronism with the paper pick-up and transfer mechanism and releases the gripper to permit the same to close in synchronism with the transfer mechanism.

Figure 4:
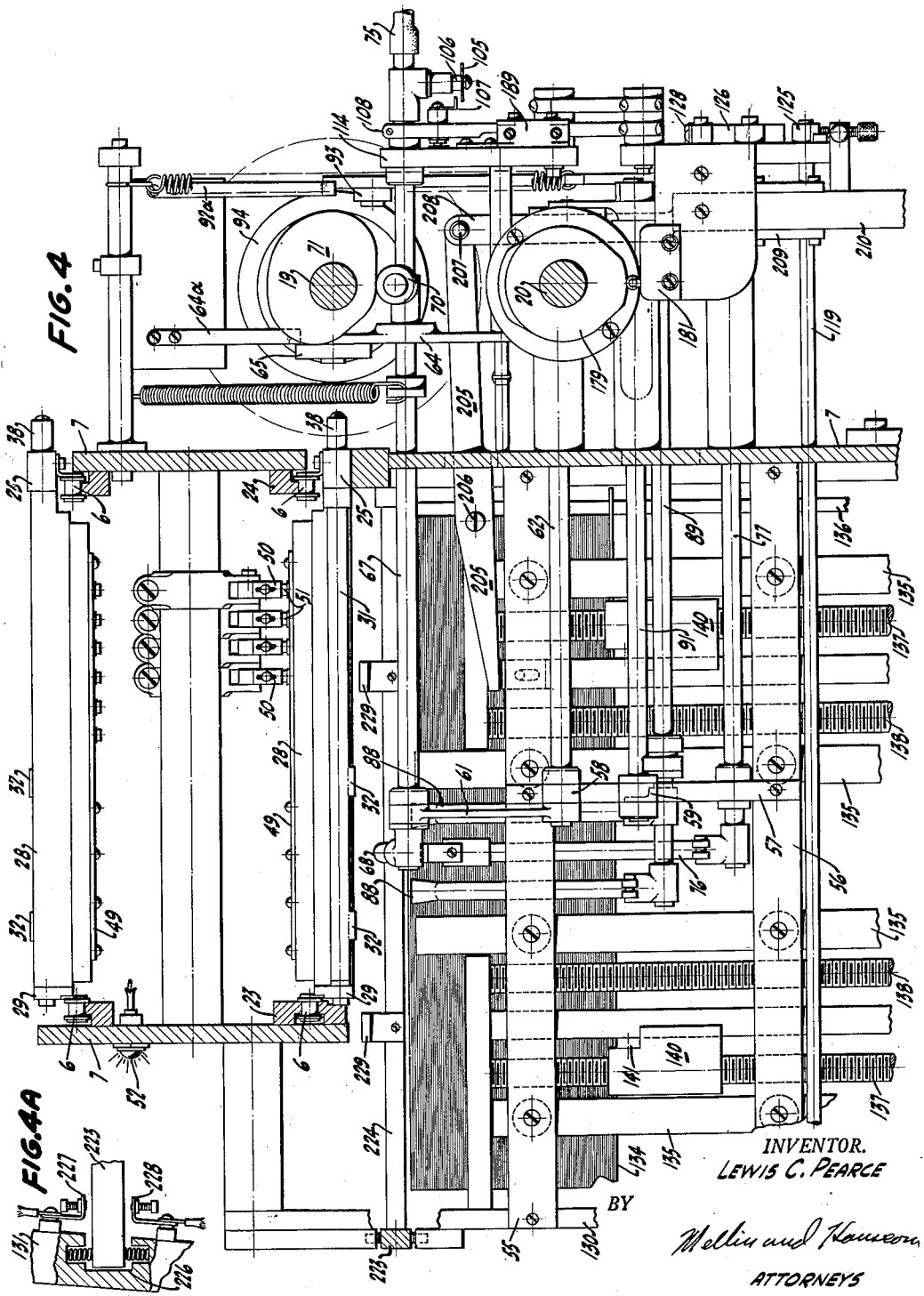
Fig. 4 is a transverse sectional view through the machine taken on line 4—4 of Fig. 3.

It is desired to point out in connection with the gripper fingers 32 that these are located equal distances on opposite sides of the center line of a stack of paper at each station, as indicated in Fig. 4. Inasmuch as there are two grippers and they are located at a substantial distance apart at opposite sides of the longitudinal center line through the stacks of paper, when they grip a paper, there will be complete assurance that it will not become out of register and will be maintained in proper register for collation with the other sheets picked up and gripped by cooperating grippers. This disposition of the gripper fingers 32, as shown in Fig. 4, enables the machine to operate on stacks of paper of different widths so that the machine is capable of use on more than one size sheet, it being limited only by

No pick-up sensing means

Each sheet gripper is equipped with a sensing means so that if no paper is picked up and gripped by the gripper, an electrical circuit is closed to open the circuit of the main drive motor of the machine and cease the operation of the latter. This sensing means includes in each gripper a pair of spring-pressed sensing plungers 47 carried by the housing 28 in register with each gripping finger 32. The sensing plungers 47 (see Figs. 8 and 9) are vertically reciprocable in the housing 28 and are insulated therefrom. They constitute contact members for one leg of a normally open electrical circuit. The plungers 47 are spring-pressed downwardly by springs 48 to enable them to be engaged by the associated gripping finger 32 in the event that no sheet of paper is interposed between the gripping fingers and such plungers 47 at the time when the gripping fingers 32 move from open to closed position. The plungers 47 are not in constant electrical contact with their associated portion of the normally open cut-out electrical circuit, as will be described, through the springs 48 and a bus bar 49.

The other side of the electrical circuit is, of course, led to ground so that contact between the fingers 32 and the plungers 47 during the proper interval will complete the circuit to the ground. However, if a page or sheet of paper is interposed between the gripping finger 32 and the plungers 47, this is sufficient insulation to prevent closing of the circuit.

At each station is a contact member 50 in constant connection with the circuit and it is adapted to be engaged by a contact 51 on a bus bar 49 of a particular gripper of each gripper set. The bus bar 49 is in electrical contact with the plungers 47. For example, the number 4 gripper of the set B will engage its contact 50 only at the fourth station, while the number 3 gripper of the set C will only engage its contact 50 at number 3 station, and likewise with respect to numbers 2 and 1 grippers of the sets D and E at stations 2 and 1.

The contacts 50 are insulated from the frame and are included in the circuit with a light bulb 52 at each station, so that in the event, for example, gripper bar 4 of the set B in Fig. 1 fails to pick up a paper at station 4, it will then contact its plungers 47. Due to the fact that contact 50 is at that time in engagement with contact 51, a circuit will be completed from ground through the gripper fingers 32, the plungers 47, and the bus bar 49, the contact 51 and the contact member 50, and through the signaling light bulb 52 at that station. Simultaneously, the closing of the circuit just referred to through the light bulb 52, as just described, will, through the medium of a relay 53, open the 220-volt circuit of the main driving motor 54 of the machine. This results in shutting down the machine and indicating by the proper signal light 52 at which station the gripper failed to be fed a paper or to grip the same.

The electrical circuit for one station is diagrammatically illustrated in Fig. 12 of the drawings, which is self-explanatory, it being only necessary to add that there is a parallel circuit for each of the other stations.

Sheet pick-up, separating and transferring mechanism

In connection with the pick-up, sheet separating and sheet transfer mechanism, there is one of these assemblies at each station and all of them have identically the same cycle of operation. The cycles of the stations, however, commence at slightly relatively different times. The sheet pick-up, sheet separating and sheet transfer mechanisms at each station are self-contained in that they are each equipped with separate operating mechanisms, except all are driven by common cam shafts. The operating mechanism at each station is illustrated in Fig. 23.

Referring more particularly to Figs. 13a to 22, inclusive, I have there disclosed in fragmentary views and schematically the construction and operation of the sheet pick-up, sheet separating and sheet transfer mechanisms which will now be described.

In Figs. 13a to 13e, inclusive, I have disclosed the pick-up, sheet separating and transfer mechanisms, but with only particular operating mechanism which is associated with the pick-up mechanism.

Reference being had to these figures, it will be seen that extending transversely and relatively fixed to the frame of the machine are two fixed transverse frame members 55 and 56 to which are secured fixed vertical frame members 57. These members 57 are provided with suitable journals 58, 59 and 60. Disposed between the sides of the machine and disposed intermediate the lines of travel of the gripping fingers 32 of the pick-up member is a rigid pick-up arm 61. This arm 61 is fixed on a pivot shaft 62 journalled at its inner end in the bearing 58 (see Fig. 4) and in bearing 63 (see Fig. 24) on the frame member 7 at the cam side of the machine. The shaft 62 projects horizontally outward at the cam side of the machine. Exteriorly of the frame member 7 and the bearing 63, the shaft 62 is fitted with a cam arm 64 carrying a cam follower roller 65 engaging an end cam 66 secured on the cam shaft 19. At the upper end of the pick-up arm 61 is a tubular shaft 67 which is pivoted in the pick-up arm 61 but upon which is fixed a pick-up nozzle 68. The tubular shaft 67 is journalled in the cam arm 64 so that it will swing through the same arc as the cam arm 64 and the pick-up arm 61 when the same are moved by the cam 66. However, adjacent the arm 64 is a short cam arm 69, the roller 70 of which engages the broad face of a cam 71 also fixed on the shaft 19.

The hollow or tubular shaft 67 also serves as a vacuum conduit between the pick-up nozzle 68 and a vacuum control valve 72, which is interposed in a vacuum line 73 connected with the source of vacuum. To operate the vacuum valve 72 there is provided a cam 74 on the cam shaft 20. There is, of course, a flexible connection 75, as shown in the drawings, between the tubular shaft 67 and the valve 72. It is intended that when the cycle of operation of the mechanisms disclosed is initiated, the cam 74 shall immediately move the valve 72 to open condition, creating a vacuum through the shaft 67 and through the nozzle 68, causing the nozzle to upturn the leading edge of the uppermost associated stack of pages or sheets by suction.

At this point in the cycle the sheet separating mechanism commences to operate, as shown in Figs. 19a to 22, inclusive. This mechanism includes a tubular separator arm 76 fixed on a tubular shaft 77. The tubular shaft 77 and the tubular arm 76 act as conduit for air under pressure and are in proper communication with each other for that purpose. Fixed at the free extremity of the arm 76 and directed toward the stack of paper is a separating finger 78 just above which is an air orifice 79.

The separating finger 78 is fixed on a spring-pressed plunger 80 in the end of the separating arm 76 to enable its position to be adjusted longitudinally of the arm 76 by means of the pick-up nozzle 68, as shown in Fig. 19a, for the purpose of being properly positioned with respect to the nozzle when the latter has upturned the edge of the uppermost sheet of paper on the stack.

In other words, by this medium the finger 78 and the nozzle tip of the nozzle 68 are always at the time of picking-up in a definite relative position with respect to the pick-up nozzle 68 so that the separating finger 68 may upon operation of the separator arm be accurately interposed between the uppermost sheet and the succeeding sheet in the stack.

Fixed on the shaft 77 at the cam side of the machine is a cam arm 81 having a cam roller 82 engaging an end cam 83 fixed on the shaft 20. This cam 83 is so timed with relation to the cam 66, which actuates the pick-up nozzle 68, that after the nozzle 68 has been operated to lower into pick-up relationship to the uppermost sheet of paper on the stack, the separating arm 76 through its cam arm 81 and its cam 83 will cause the separator arm 76 to move toward the stack and interpose its separating finger 78 between the uppermost sheet (whose end has been upturned by the suction of pick-up nozzle 68) and separate the uppermost sheet from the stack. As it does so, a cam 84 (Figs. 19a, 19c and 20c) operates to open an air valve 85 interposed in an air pressure line, the discharge port of which is connected through flexible conduit 86 to the shaft 77, causing air under pressure to be delivered through the valve 85, the flexible conduit 86, the shaft 77, the separating arm 76, through the orifice 79 and discharge an air blast between the sheets and separate them. The air pressure line in which the valve 85 is interposed is connected to a source of air under pressure by a conduit 87. The latter position of the parts is shown in Figs. 20a to 20c, inclusive.

By reference to Figs. 19a and 20a it will be seen that the engagement of the upper end of the plunger 80 with the underside of the pick-up nozzle 68 will cam the pick-up finger 78 into proper position between the upturned sheet edge and the stack so as to insure proper registry and accommodate certain variations in the height of the stack relative to the mechanical parts just described.

During the time that the edge of the selected sheet has been picked up and the separating mechanism brought into operating position to separate the sheets, the transfer mechanism has commenced to be conditioned so that it will be operative to effect transfer of the sheet. Each transfer mechanism includes a pair of spaced transfer nozzles 88 which are located at spaced distances at opposite sides of the pick-up nozzle 68. The latter is located centrally between the lines of travel of the gripping fingers 32 on the grippers.

These transfer nozzles 88 (see Figs. 16a, 17a and 18a) are tubular so that a vacuum may be drawn therein and are fixed upon and in vacuum communicating connection with a tubular shaft 89 supported at one end in the free end of an arm 90, the other end of which is fixed on a shaft 91 in journal 59. The shaft 89, of course, extends transversely of the machine as do the shafts 62 and 77. The shaft 89 extends outwardly at the cam side of the machine where it is fitted with a cam arm 92 having a cam roller 93 engaging a cam 94. This cam, as a matter of fact, is concentric to the cam 66 but of a diameter larger than the same, both end cams being formed on the same basic disc, and, consequently, the cam 94 is driven by the cam shaft 19. The shaft 91 extends in parallelism to the shaft 89 and is journalled both in the journal 59 and in journals 95 carried by the side member 7 of the main frame. At its outer end there is fixed a short link 95 which is pivoted on the shaft 89 at its other end. The link 96 is clamped tightly to the shaft 91 and also clamped to that shaft is a cam arm 97 carrying a cam roller 98 engaging an end cam 99. This cam 99 is fixed on the cam shaft 20.

The timing of the various cams is such, as illustrated, that during the operation of the pick-up nozzle 68 in upturning the end of the topmost sheet of the stack and the entry of the separating finger 78 beneath such sheet and air blasting the sheets apart, the transfer nozzles 88 move downwardly to the position shown in Figs. 17a to 17e and thereafter inwardly to a point beneath the separated sheet which is picked up and being elevated by the pick-up nozzle 68. Thereafter, the cam action is such that the transfer nozzles 88 move upwardly into engagement with the bottom of the sheet just prior to the positioning of the parts as shown in Fig. 15a. After the transfer nozzles have engaged the sheets, the pick-up nozzle 68 is moved by its cam operation in a direction away from the stack to an unobstructing position or to that indicated in Fig. 15a.

Referring to Figs. 17a to 17e, inclusive, the parts are there shown in the condition which they assume just prior to the pulling of a vacuum through the transfer nozzles 88. It is to be pointed out that the shaft 89 is connected by a flexible connection to the inlet of a vacuum valve 100, which is capable of placing the interior of the shaft 89 and the nozzles 88 in communication with a vacuum pump through a conduit 101. The valve 100 is operated by a cam 102 on the cam shaft 20 so that the vacuum is pulled through the nozzles 88 just about the time when the nozzles 88 come into contact with the underside of the sheet being lifted by the pick-up nozzle 68. At the same time the vacuum through the nozzle 68 is being cut off, as illustrated in Figs. 14a to 14d, inclusive, in which figures it will be seen that the cam 74 is about to pass over its high point and cause closing of the valve 72, which closing occurs just subsequent to the transfer nozzles engaging the underside of the sheet and a vacuum being pulled therethrough. There is a slight overlapping between the commencement of the vacuum pull through the nozzles 88 and the cutting off of the vacuum through the nozzle 68 to make certain that the sheet is not released by both nozzles. Therefore, there is a building up of a vacuum at the ends of the transfer nozzles 88 and a diminishing of the vacuum at the end of the pick-up nozzle 68.

This overlapping also has utility for sensing when two sheets have been elevated by the pick-up nozzle instead of one, as shown in Fig. 25. From Fig. 25 it can be explained that the vacuum through the transfer nozzles 88 being built up will normally overcome the diminishing vacuum pulled through the pick-up nozzle 68 at that point so as to remove the sheet from the pick-up nozzle 68. However, if two sheets are picked up, the transfer nozzles 88 will only adhere to the lowermost sheet, leaving the uppermost still adhered to the end of the nozzle 68 and preventing breaking of the vacuum therein and its line.

During such time of operation a cam 103 (see Figs. 12 and 24) will have moved into a position closing a micro-switch 104 in the sensing and signalling circuit. The time interval during which the cam 103 maintains the switch 104 closed is the period of time during which no vacuum is normally maintained in the line of the pick-up nozzle 68. When a vacuum is maintained in said line, it is sufficient to maintain the plunger 106 upraised to maintain a contact 105 thereon in contact with a second contact 107 in the sensing circuit. Therefore, if the vacuum is not broken in the nozzle 68 because of a sheet closing its end, the contact 105 will remain in contact with the contact 107 at the time when the cam 103 closes the switch 104. The circuit will then be closed, indicating by illumination of the bulb 52 and a cutting out of the machine drive motor that more than one sheet has been picked up by the pick-up nozzle 68. It should be explained that the contour of the cam 103 and its timed relation in the circuit is such that it normally maintains the switch 104 closed only during that period when contact 105 is out of contact with the contact 107 due to normal breaking of the vacuum by transfer of a sheet to the transfer nozzles 88.

It should be pointed out, as shown in Figs. 12 and 24, that the contact 105 is on a plunger carried by the rock shaft 67, which shaft also carries a lever 108 which is fixed at one end thereon. The contact 107 is carried by that lever so that it is always maintained in register with the contact 105. The contact 107 is insulated from the lever 108, but is in constant electrical contact with a contact member 110 through the medium of a contact pin 111. Also on the lever 108 is a contact member 112 which will be to the ground side inasmuch as it is not insulated from the lever 108. The contact member 112 engages a contact 113 (see Figs. 24 and 26) which is electrically connected to the hot side of the circuit, which contact 113 is mounted on a dielectric arm 114 pivotally suspended from one end of the shaft 67, but relatively fixed to the lever 64 by means of a tie rod 115 (see Fig. 24).

In Figs. 27 and 28 of the drawings, I have illustrated in subassembly the valve mechanisms for controlling the vacuum to the pick-up and transfer nozzles and the air pressure to the sheet spreading mechanism. Reference being had to these figures, it will be seen that the vacuum control valve 72 for the sheet pick-up mechanism, the control valve 85 for the sheet spreader mechanism and the vacuum control valve 100 for the transfer mechanism are arranged in side-by-side order and mounted on the frame of the machine at the cam shaft side thereof. The conduit 73 for connecting the pick-up nozzle to a vacuum pump through the valve 72 as well as the conduit 101 connecting the transfer nozzles through the valve 100 to a vacuum pump are both connected to a vacuum manifold 116 suitably connected to a vacuum pump (not shown) capable of producing the desired vacuum. The manifold 116 is connected to the valves 72 and 100 of each station so that the manifold 116 is common to all stations.

In Fig. 27 the manner of the valve operations in either establishing or interrupting vacuum to the various nozzles through the medium of the valves is clearly illustrated.

The conduit 87 which connects the sheet spreader nozzle 68 to a source of air under pressure through the valve 85 is connected with an air pressure manifold 117 connected with a suitable compressor or other source of air under pressure, either mounted on or contiguous to the machine. This manifold 117 is likewise common to the valves 85 of all of the stations.

In the vacuum lines between the pick-up and transfer nozzles and the valves 72 and 100 there is interposed in each a manual shut-off valve 118, which may be operated from a remote point at the work side of the machine. This enables the operator of the machine or the attendant from the work side of the machine to cut out the vacuum at any station, if it is desired to render that station inoperative for any reason. The mechanism for operating these valves is shown most clearly in Figs. 23 and 29.

Reference being had to those figures, it will be seen that extending transversely of the machine is a valve operating shaft 119 fitted with a hand lever 120 exteriorly of the machine at the work side thereof. At the cam side of the machine, the shaft is fitted with a bevel gear 121 (see Fig. 29) which meshes with a bevel gear 123 on a shaft 122 extending upwardly in line with the axis of one of the valves 118 and is rigidly fixed to the valve stem thereof, so that turning movement of the shaft 119 will cause opening and closing of the valve 118. The valve stem of this valve is fitted with a bevel gear 124 (see Figs. 23 and 27) in mesh with a similar bevel gear on the valve stem of the other valve 118 so that the two valves open and close in unison; closing, of course, effects cutting off the vacuum to the pick-up mechanism and to the transfer mechanism.

When a station is cut out as just described by cutting off the vacuum thereto, the detector or sensing electrical circuit (see Fig. 12) of that station is opened. This is accomplished by a mechanism most clearly disclosed in Figs. 23 and 29.

Reference being had to those figures (and Fig. 12), it will be seen that at the cam side of the machine the shaft 119 is fitted with a detent 125 which normally, when the valves 118 are closed, is in an unobstructing position relative to a switch actuator 126 pivoted as at 127. However, when the shaft 119 is rotated to close the valves 118 and cut off the vacuum to the particular station, the detent 125 is swung clockwise with reference to Fig. 23 to engage the switch actuator 126 and swing the same upwardly to move a contact arm 128 interposed in the detector circuit of that station out of contact with its contact 129, thus opening the circuit. There is one of these assemblies, as just described, at each station.

This operation maintains this particular sensing or detector circuit open so that regardless of the operation of the mechanical parts of that particular station, there can be no completion of the detector circuit so as to either indicate that it is out of order or to open the motor circuit of the main driving motor of the machine. Thus, the remainder of the stations may be operative but the selected station is maintained inoperative. This is in order that the machine may operate if desired with a lesser number of stations than the machine is equipped.

*Over travel cut out for transfer and pick-up mechanism*

I have provided a medium for cutting out a station at which for some reason there is over travel of the cam arm 64 which actuates the pick-up nozzle 68. This means includes a switch arm 64a on the hot side of the sensing circuit shown in Fig. 12. In this connection also see Fig. 23. If for some reason there is over travel of the cam arm 64 to an extent where it will contact the switch lever 64a which is insulated from the frame, the circuit will be grounded, completing a circuit through the sensing bulb 52, the relay 53, and opening the main motor circuit.

A similar mechanism is provided for the transfer mechanism. In the event that the cam 92 of the transfer mechanism over travels, it will engage a similar contact arm 92a and ground the sensing circuit, completing it through the bulb 52, the relay 53, and opening the circuit of the main drive motor 54.

*Automatic paper feeding mechanism*

As previously pointed out herein, each station is provided with a mechanism for receiving stacks of paper and for feeding that paper stack vertically in synchronism with the operation of the other mechanism of the machine in order to maintain the top sheet of the stack in proper position relative to the pick-up, sheet spreading and sheet transfer mechanisms of that station. This is in order that the topmost sheet may be picked up and conditioned to be grasped by the grippers as they come into operation in proper synchronism with those mechanisms. Naturally, if the top of the stack is properly relatively positioned with respect to those mechanisms, it will be properly positioned with respect to the gripper mechanisms.

Inasmuch as the stack receiving means at each station is identical and inasmuch as the stack feeding and elevating mechanism is precisely alike, but one will be described.

Reference being had to the drawings, particularly to Figs. 3, 4, 32 and 37, it will be there seen that at each station there is provided a pair of rigid side frame bars 130 and 131 defining the front and back ends of the magazine within which is contained the paper stacks. The frame bar 130 is stationarily fixed to the frame of the machine, while the frame bar 131 is pivoted at its upper end as at 132 to the frame of the machine, and detachably connected at its lower end as at 133 to the frame of the machine. The detachable connection enables the lower end of the frame bar 131 to be adjusted longitudinally of the machine, as illustrated in Figs. 32 and 33. The reason for this adjustment will be explained hereinafter, but, in general, the purpose thereof is to accommodate stacks of paper sheets which may be thicker at one end, for any reason such as a folded condition, than the other. It is desired to point out that the frame bars 130 and 131 are at an inclination relative to the vertical, although they are in parallelism with respect to each other, except when adjustment is made for the purposes just described. The purpose of the inclination is to maintain the elevator platforms 134 at a slight angle to the horizontal so that the paper stack will by gravity seek to maintain the forward edges of the paper in the stack in exact register against vertical guide bars 135 arranged vertically of the frame at spaced intervals between the sides of the frame, or between the frame bar 130 and a back gage grid 136. This latter is adjustably supported at the side of the machine opposite the frame bars 130 and 131 in parallelism with the sides of the machine. By adjusting this gage grid 136 transversely of the machine, the machine may be used to accommodate paper sheets of varying widths. The vertical guide bars 135 are rigid with respect to the frame of the machine and present a plane gaging surface against which the edges of the paper of the stack may bear to maintain the sheets in proper register.

Thus, hereinafter when referring to the elevator platforms 134 as being horizontal, it will be meant that they are substantially horizontal but tilted at an angle to the horizontal, and when it is referred to the vertical movement thereof, will be meant substantially vertical but actually in a direction slightly inclined to the vertical.

Thus, it will be seen that the frame bars 130, 131, the guide bars 135, and the gage grid 136 constitute a magazine in which the paper stacks are contained. It should be pointed out that there are two elevator platforms 134 at each station in each magazine for vertical movement with respect thereto. It should also be pointed out that there is a separate drive mechanism for raising and lowering the elevator platforms 134 within the magazine for a purpose and in a manner which will be described. Actually, each platform 134 is removably insertable into the magazine and is removably supported upon feed nuts adjacent their four corners, by means of which they are elevated and lowered in the magazine. This is to enable a stack of paper to be inserted into the magazine and stacked on the platform. Likewise, as will be hereafter pointed out, it is intended that as the uppermost elevator platform 134 is fed upwardly automatically when the machine is in operation, the lower elevator platform 134 may be lowered, charged with paper sheets and independently elevated at a relatively high rate of speed until it abuts against the bottom of the upper stack so as to maintain the stack supply of paper sufficient at all times to keep the machine in continuous operation.

When the upper end of the lower portion of the stack is elevated up to abutment with the lower end of the upper portion of the stack in a magazine, the thin elevator platform 134 interposed therebetween may be pulled out, thus replenishing the stack without interrupting the operation of the machine.

There is a driving mechanism for the elevator and feed mechanisms of each magazine at each station, and that mechanism is more clearly disclosed in Figs. 4, 29 and 30. Reference being had to these figures, it will be seen that each magazine is provided with two sets of feed screws 137 and 138, four to each set, vertically arranged in parallelism with the gage bars 135 at the forward and rear ends of the magazine, but, as illustrated in Fig. 37, offset slightly with respect to the guide bars 135 in order that they will not contact the paper. Each set of these feed screws is arranged in two pairs, one pair at each end of the magazine. There is a pair of feed shafts 137 at each end of the magazine and a pair of feed shafts 138 at each end of the magazine.

Between the feed shafts 137 and 138 of each pair is a key bar 139. On each feed shaft is a non-rotatable feed nut 140, which feed nuts so engage the key bars 139 as to render said feed nuts non-rotatable but enable them to travel longitudinally with relation to the feed shafts upon rotation of the latter. In that there is a feed nut on each of the feed screws 137, there will be one thereof located adjacent each corner of the magazine which will move in unison to support the platform 134 at the proper inclination with respect to the gage bars 135. The feed nuts 140 of the feed screws 138 will be similarly located adjacent the corners of the magazine for similar reasons and purposes.

The feed nuts 140 are each provided at their upper ends with elevator platform supporting pawls 141 which will bear the weight of the platform and the paper imposed thereon, but may pivot to an unobstructing position, as shown in Fig. 31, when they pass downwardly by a stack of paper.

All four of the shafts 137 are driven in unison and all four of the shafts 138 are driven in unison but independently of the shafts 137. Which set of feed screws it is desired to operate may be selectively determined. Assuming, for the purpose of illustration, that there is a supply of paper on an elevator platform 134 in proper position relative to the remainder of the operating mechanism of the machine, and that the machine is in operation and further assuming that the upper elevator platform 134 supporting the uppermost stack in the magazine is being operated by the four feed shafts 138, the drive may be explained most clearly from Fig. 31 taken in conjunction with Figs. 32 to 35.

Fig. 31 diagrammatically illustrates the automatic elevating drive. This drive includes a cam 142 on the cam shaft 20 of the machine. During each cycle of operation of the cam shaft 20, which is one complete revolution, one collating operation is accomplished. During the cycle the cam 142 depresses a reciprocable rack 143 vertically reciprocable on the frame, as clearly illustrated in Figs. 27 and 28. The teeth of this rack are engaged with a pinion 144 on a stub shaft 145. This stub shaft, through the medium of a pair of spur gears 146, drives a countershaft 147 by means of a one-way ratchet clutch 148, so that each time the cam shaft goes through one cycle of revolution, the shaft 147 is rotated one increment of rotation, always, of course, in the same direction. This rotation of shaft 147 is imparted from a pinion 149 thereon through gears 150 and 151 to two drive take-off shafts 152 and 153. Rotatably mounted on the drive take-off shaft 152 is a sprocket 154, and rotatably mounted on the drive take-off shaft 153 is a sprocket 155. Each take-off shaft 152 and 153 is provided with an overrunning clutch 156 and 157, which may be manually operated by reciprocation of manually operable control shafts 158 and 159 to selectively render the clutches 157 and 156 effective or ineffective in clutching the respective sprockets 154 and 155 to the drive take-off shafts 152 and 153.

The sprocket 154 on the take-off shaft 152 is connected by an endless sprocket chain 160 to a sprocket 161 on a shaft 162. This shaft is fitted with helical gears 163 meshing with helical gears 164 on the other pair of feed screws 137 at the opposite end of the magazine. Therefore, as the drive take-off shaft 152 is constantly driven when the clutch 157 thereof is engaged, an intermittent drive will be transmitted through the sprocket chain 160 and the shafts 162 and 162a to drive the four feed screws 137 simultaneously.

Normally, the sprocket 165 and the sprocket 161 are of the same number of teeth so that both ends of the elevator platform supported by the feed screws thereon move on the same lineal rate. However, in the event that the sheets of paper to be collated are thicker at one end than the other and originally the stack is inclined a greater amount than is normal, the ratio between the sprockets 161 and 165 may be changed so as to compensate for this difference in the sheet thickness and inclination and thereby properly present the sheets for collation at the top of the stack. Such an arrangement is shown in broken lines in Fig. 32. Of course, adjustment of the frame bar 131 longitudinally would change the distances between the shafts 162 and 162a, placing a slack in the chain 160. This may be compensated for by adjustment of the position of a tightener sprocket 167.

Similarly, the sprocket 155 of the drive take-off shaft 153 is provided with an endless sprocket chain 168 which meshes with a sprocket 169 on a shaft 170 and a sprocket 171 on a shaft 172, and thence with a sprocket pinion 173. The shafts 170 and 172 are fitted with helical gears 174 meshing with helical gears 175 on the four feed screws 138. The operation of this drive circuit is the same as that described in connection with the drive take-off shaft 152 with the exception, of course, that it drives the second set of feed screws 138.

Similarly, this drive of the feed screws 138 may be adjusted by changing the ratio of the sprockets 171 and 169 and adjustment by a tightener sprocket 176 to similarly provide a differential in drive in opposite ends of the platform for the same purpose as that just described.

The amount of the increment of feed or rate of feed upwardly of the elevators may be adjusted by adjusting the effective length of the stroke of the reciprocable rack 143. This adjustment is shown in Figs. 27 and 28, where it will be seen that the rack is provided with an abutment 177 to engage an adjusting screw 178 which is stationarily fixed to the frame. By adjusting the adjustment screw 178 downwardly, the upward stroke of the rack 143 is limited so that the effective stroke imparted thereto by the cam 142 will be shortened. If considerably thicker sheet material is to be collated so that the upward feed will not be rapid enough within the limits of the cam 142, the ratio of the gears 146 may be changed so that a greater increment of movement will be imparted to the shaft 147 during each effective stroke of the rack 143.

It should be stated here that it is not intended that the elevator be moved an increment every time a sheet of paper is removed from the stack, because this would require an extraordinarily fine adjustment. It is intended that the upward feed of the elevators in increments be at a rate greater than the rate of the take-off at the stack, in that there is a certain tolerance allotted within which the pick-up nozzle 68 will operate. Therefore, it is intended to elevate the stack to the upper limits of the tolerance and then cease the upward feed of the elevator until the stack is used up to approximately the lower limit of the tolerance of the nozzle 68.

This is accomplished by automatically latching the rack 143 out of engagement with the cam 142, when the stack has been fed to the upper limit of tolerance, and automatically releasing the rack for operation to recommence the upward feed, when the top of the stack has been used up to the lower limit of the tolerance.

For this purpose I provide an electrical control, as shown particularly in Figs. 26, 27 and 28 of the drawings.

Reference being had to those figures, particularly to Fig. 26, it will be seen that on the cam shaft 20 is a cam 179 which engages a switch actuating arm 180 to close a switch 181 during that portion of the cycle of operation of the pick-up nozzle 68 when the nozzle is at approximately the top of the stack. When the cam 179 closes the switch 181, this conditions the circuit for closing in the event that the height of the paper is either at or above the upper limit of tolerance, or at or below the lower limit of its tolerance. If the top of the paper stack is at the upper limit of tolerance, the nozzle arm 108 will contact with the contact arm 113 and complete a circuit through the switch 181, and thence through a relay 182 which, when energized, will close the switches 183 and 184. The closing of the switch 183 maintains a closed circuit through the relay 182, maintaining the same energized to maintain the switch 184 closed, regardless of the opening of the switch 181 or the arm 108 moving out of contact with the arm 113.

The closing of the switch 184 and maintaining it closed, closes a latching circuit through a solenoid 185. When this solenoid is energized, it actuates a keeper 186 and moves it into latching position with respect to a latch plate 187 on the rack 143, which engagement maintains the rack out of operative engagement with the cam 142, thus stopping the paper upward feed. The pick-up nozzle 68 then continues to pick up paper off the stack until the lower limit of tolerance is reached, at which time the arc through which the arm 108 swings will be sufficiently increased to swing the arm 113 about its pivot a distance moving the switch actuating arm 188 the distance required to open the switch 189. When the switch 189 is opened, it opens the circuit of the relay 182, opening the switches 183 and 184. Opening of the switch 184 de-energizes the solenoid 185, causing the keeper 186 to move out of engagement with the keeper plate 187, releasing the rack 143 so that it will again commence to be operated by the cam 142 and commence the upward feed of the paper, as previously described.

The rack latching circuit will then be ineffective to again operate the latching means until the top of the stack has again risen to a point where the movement of arm 108 has been so diminished that it will not move the arm 113 a distance sufficient to actuate the switch arm 188 to open the micro-switch 189. However, when the upper tolerance is again reached, which will be at the time when the arm 113 will be so actuated by arm 108 that the contact arm 188 will not move a sufficient distance to open the switch 189, then contact of the arm 108 with arm 113 at the proper period of the cam operation 179 will again close the circuit through the relay 182, the switches 183, 184, closing the circuit through the solenoid 185 and again latching the rack against movement.

Thus, it is seen that by proper timing of the cams 179, the range of tolerance between uppermost and lowermost positions of the stack top may be determined and the stack of sheets automatically operated to keep the paper properly positioned in the manner just previously set forth.

For the purpose of stopping the machine and indicating trouble at a particular station, when there is over upward travel of a stack or jamming on top the stack, I have provided a mechanism shown in Figs. 3, 4 and 4a. This mechanism includes a longitudinal bar 223 at each side of each magazine at the top thereof, as illustrated in Figs. 3 and 4. Extending transversely of the machine and connected at its ends to these bars 223 is a rigid jam-sensing bar 224. The forward ends of the levers 223 are pivoted to the frame member 139 at 225. At their rear ends these levers each extend into a socket 226 and are spring-loaded to normally project centrally within the socket. However, this end of the bar 223 is permitted a limited amount of upward and downward movement. The amount of upward movement permitted, as shown in Fig. 4a, is sufficient for it to engage a contact 227 insulated from the frame and interposed in the sensing circuit shown in Fig. 12. A similar contact 228 similarly insulated from the frame is positioned a spaced distance below the normal position of the bar, but in such position that it may be contacted thereby if the bar is depressed. Naturally, if the bar engages either of the contacts 227 or 228, the sensing circuit shown in Fig. 12 will be grounded and thus completed through the bulb 52, the relay 53, to open the circuit of the main drive motor.

It is seen that if the stack overfeeds upwardly for some reason, it will engage the jam-sensing bar 224 and elevate the members 223 to contact the contacts 227 and effect closing of the sensing circuit.

If for some reason a jamming occurs in the machine, causing depression of the jam-sensing bar 224, a similar result will be effected.

In addition to the functions of the jam-sensing bars 224 just described, these bars serve as additional safety devices for manual emergency stopping of the entire machine. For example, if, because of necessity, the machine operator desires to stop the machine operation without taking the time to reach the control button, the operator may, if he is at any point along the work side of the machine, reach for any one of these jam-sensing bars 224 and move it either downwardly or upwardly, and thereby immediately cease the operation of the machine.

*Manual paper feeding mechanism*

I have also provided a manually controlled mechanism for selectively operating the two sets of feed screws 137 and 138. The rate at which the manually controlled drive operates the feed screws 137 and 138 is much greater than that at which they are operated by the automatic feed heretofore described. The selective manually controlled drive includes a pair of reversible electric motors 190 and 191 (see Fig. 31), the drive shafts of which are directly connected to the shafts 192 and 193 of the sprocket pinions 166 and 173 which are in mesh with the sprocket chains 160 and 168.

As previously stated, only one set of the feed screws 137 and 138 is used at a time and driven automatically to feed the stack of sheets upwardly. Therefore, if desired, the other set of feed screws may be driven in either direction through the proper sprocket pinion 166 or 173 by the proper motor 190 or 191.

The circuit of the motor 190 includes a reversing switch 194 which is provided with a switch actuator 195 which, upon rotation in one direction, will close the switch 194 to drive the motor 190 in one direction, and, upon rotation in the opposite direction, will close the switch and reverse the circuit of the motor and drive it in the opposite direction, there, of course, being a neutral position of the switch. The actuator 195 is actuated by rotation of the manual control shaft 159. The second motor 191 is provided with a similar switch 196 having an actuator 197 similarly operated by the manual control shaft 158.

Referring to the condition shown in Fig. 31, if it is desired to add to the paper supply in the magazine by moving of additional paper upwardly and adding it to the bottom thereof, the feed nuts 140 of the set of the feed screws 137 then not in use may be lowered to their lowermost limit by selective operation of the proper motor 190 to effect this operation. The paper is then stacked on the elevator platform 134 so lowered and the circuit of the motor 190 reversed and closed so that the newly added portion of the stack will be rapidly elevated until it abuts against the bottom of the portion of the stack then in use, at which time the motor 190 circuit is opened. The elevator platform 134 interposed in the stack is then removed. This imposes the weight of the entire stack on the elevator platform 134 just elevated.

Immediately that the interposed elevator platform 134 is removed and the weight of the stack is imposed on the other elevator platform 134 just elevated by the manually controlled feed just described, the automatic drive is switched from the set of feed screws 138 to the set 137 by manually releasing the clutch 156 by shifting the manual control shaft 159 endwise outwardly and manually engaging the clutch 157 by shifting the manual control shaft 158 endwise inwardly.

The clutches 156 and 157 are of the overrunning type as illustrated in Figs. 33 and 34.

Each of the clutches 156 and 157 are identical in construction so a description of one thereof suffices for both. They are of more or less conventional design and include a ratchet 198 and a pivotal pawl 199 having a disengaging pin 200. When the pawl 199 is engaged with the clutch part coupled to the sprocket 155, a drive is effected from the shaft 153 to the sprocket. When the pawl 199 is disengaged from the ratchet, no drive is effected. The pawl 199 is normally engaged with the ratchet, but may be disengaged therefrom by movement of the shiftable clutch part 201 which is fastened to the control shaft 159. When the shifting clutch part 201 is shifted into register with the pawl pin 200, it moves the same and the ratchet radially outward out of mesh with the ratchet, thus disengaging the clutch.

It will be noticed that the control shafts 158 and 159 are secured in the shiftable clutch part 201 of the respective clutches, which clutch parts each have an axially projecting key 202 reciprocable in a diametrical slot in the end of switch actuators 195 and 197.

It is seen by this that regardless of whether the clutches 156 and 157 are engaged or not, rotation of the control shafts 158 and 159 will actuate the switches of the motors 190 and 191.

I have provided means for preventing motor-driven rotation of the pinions 166 and 173 driven by the motors 190 and 191 counter to the direction of the sprocket chains with which said pinions 166 and 173 are in mesh. Such means is effective only when the sprocket chains are effecting an automatic drive of the stack feeding mechanism. I accomplish this by providing a stop lug 203 on each shiftable clutch part 201 (see Figs. 33 and 34), which stop lug, when the clutch is engaged by shifting the associated manual control shaft axially inwardly, will register with a fixed stop abutment 204 on the frame so that the control shaft 159, due to its connection with the shifting clutch part 201, can only be rotated in one direction.

For example, assuming that the clutch 156 is engaged as is shown in Fig. 33, the lug 203 on the shifting clutch part 201, as shown in Fig. 34, would prevent the shaft 159 from turning the switch actuator 195 in a direction driving its associated motor 191 in a direction causing the latter to drive the pinion 173 in a direction counter to that in which it would be normally driven in automatic drive by the sprocket chain 168. The manual control shaft can, however, be turned in the opposite direction driving the motor 191 to cause rotation of the pinion 173 in the same direction as the sprocket chain 168, causing overrunning of the clutch 156.

Referring again to Fig. 31, after the automatic drive has been transferred from the set of feed screws 138 to the set 137, as just previously described, the feed nuts 140 may be run down on the feed screws 138 by operation of the motor 191, as previously described. During this operation the feed nuts 140 must pass downwardly along the sides of the stack, and this is the reason for the provision of the pivotal elevator platform holding pawls 141, as previously described. Due to the fact that these pawls are pivoted, they readily pivot to unobstructing positions during the downward movement of the feed nuts 140.

The automatic cut out for the manually controlled motors

I have incorporated within the machine a means which is operated by the feed nuts when they reach the uppermost anad lowermost limits of their travel to automatically open the circuits of the motors 190 and 191 in the event such circuits are closed, so as to prevent jamming or breakage of the parts. This mechanism is most clearly illustrated in Figs. 4, 29, 30 and 36 of the drawings, and comprises at the upper end of the machine an upper feeler lever 205 which is pivoted to a fixed part of the frame as at 206. The inner end of the pivoted lever is in a position to be engaged by the feed nuts of the two sets of feed screws 137 and 138 as such nuts reach the top limit of their travel on such feed screws. The other end of the lever 205 is pivoted as at 207 to the upper end of a vertical slide bar 208, the lower end of which, as shown in Fig. 36, projects into and is reciprocably mounted in a U-shaped slide guide 209 fixed to a bracket 210 rigidly connected to the frame of the machine.

When the inner end of the lever 205 is engaged by an upwardly moving feed nut 140 on either of the adjacent feed screw shafts, it is moved upwardly causing downward movement of its other end and accompanied downward movement of the slide bar 208.

At the lower end of the machine is a lower feeler lever 211 pivoted to the frame as at 212 and adapted to be engaged by the feed nuts 140 in a manner almost identical to that as described in connection with the lever 205. For this purpose its inner end is positioned intermediate the same two feed screws 137 and 138, being one of each of the two sets 137 and 13, and adapted to be engaged by a nut 140 of either thereof when such nut reaches the lower limit of its travel on one of said feed screws. The outer end of the feeler lever 211 is connected to a vertical lower slide bar 213 which projects upwardly with its upper end reciprocably projecting into a U-shaped guide 214 which is in vertical register with the guide 209.

Oscillation of the upper feeler lever 205 results in reciprocation of the lower end of the upper slide bar 208 within the slide guide 209, and similarly oscillation of the lower feeler lever 211 results in vertical reciprocation of the lower slide bar 213 and causes vertical reciprocation of the upper end of said slide bar 213a in the lower slide guide 214.

Arranged between the slide guides 209 and 214 in side by side relationship therein with their upper ends reciprocably mounted in the upper slide 209 and their lower ends reciprocably mounted in the lower slide guide 214 is a pair of rack bars 215 and 216 which may independently reciprocate to a limited extent in said guides. The rack bar 215 has a segmental rack 217 formed thereon, and the rack bar 216 has a rack segment 218 formed thereon. The rack segment 217 is in mesh with the pinion 219 formed on the shifting clutch part 201 of the clutch 157 (see Figs. 31 and 33). The rack segment 218 is similarly in mesh with the pinion 220 on the shiftable clutch part 201 of the clutch 156. This is so that rotation of the manually controlled shafts 158 and 159 to operate the switch actuators 195 will affect the position of the rack segments 217 and 218 and the position of the rack bars 215 and 216 on which they are mounted.

It is intended that downward movement of the upper bar slide caused by upward engagement of the inner end of the upper feeler lever 205 by a feed nut 140 will shift the proper rack segment downwardly to a point turning its meshed pinion to a position placing the associated switch actuator in neutral position. For example, in the event that one of the manually controlled shafts, say 159, is turned to operate the switch actuator 195 to place the motor 191 in operation, running the feed nuts 140 of the set of feed screws upwardly without any paper being in the machine, when the feed nuts 140 reach the upper limit of their travel, one of the feed nuts will engage the inner end of the feeler lever 205 and move the same upwardly. However, at the time that the control shaft 159 and its actuator 195 was rotated to effect closing of the switch, it conditioned the rack bar 216 through the rack 218 by moving it upwardly into engagement with the lower end of the upper slide bar 208, so that any downward movement of the upper slide bar would immediately move the rack bar 216 downwardly, and through the rack segment 218 turn the pinion 220 an amount turning the switch actuator of motor 191 to return the switch of that motor to neutral position. Consequently, the upward movement of the inner end of the feeler lever 205 which is translated into downward movement of the slide bar 208 will effect this operation of opening the motor circuit, when the feed nut 140 reaches the upper limit of its travel.

The operation of the lower feeler lever by a feed nut smiliarly cuts out the motor. For example, should the manually controlled shaft 159 be turned in a direction closing the circuit of the motor 191 to move the feed nuts downwardly, when the feed nuts reach the lower limit of their travel, they will engage the inner end of the lower feeler lever 211 and move that inner end downwardly. At the time that the manually controlled shaft 159 was rotated to close the switch of the motor 191, it likewise, through the pinion 220 and the rack segment 218, shifted the rack bar 216 downwardly so that upon upward movement of the lower slide bar 213 conditioned by engagement of a feed nut with the inner end of the feeler lever 211, the rack bar 216 would be moved upwardly to normal position, effecting turning movement of the switch actuator 195 through the rack segment 218 and the pinion 220 to place the switch of the motor 191 in neutral position, automatically cutting out the motor drive.

Exactly the same operation is effected when the other set of feed screws is operated by its motor 190 through the medium of the control shaft 158, and it is believed that the two operations being identical, there is no necessity for repeating the cut-out operation.

It is believed understood, of course, that the automatic cut-out mechanism just described is provided at each station in that each station is provided with its independent motors 190 and 191.

I have also made provision for opening the circuit of the main shaft drive and to illuminate the out of order signal at a station when the feed nuts 140, when under automatic operation (such as might be the case when the machine runs out of paper), over travel upwardly or reach the upper limit of their travel on the feed screws. This is accomplished through the means of the upper slide bar 208 by forming a switch actuator lug 221 (see Figs. 12, 32 and 36). When the feed nuts 140 over travel upwardly while under automatic operation, no cut-out can be effected by operation of the rack bars 215 and 216 by the upper slide bar 208 because the circuits of the motors 190 and 191 are already open. Consequently, it is necessary to provide the auxiliary means which includes the lug 221, which will engage a contact 222 insulated from the machine and ground the sensing circuit heretofore described, closing a circuit through the indicator bulb 52, through the relay 53, opening the circuit of the main motor 54 of the main drive of the machine.

*Synopsis of operation*

In operation of the machine, it is constructed as heretofore described and the various stations are supplied with stacks of paper sheets or pages to be collated. Regardless of whether the main drive motor circuit is opened or closed, the stack elevating mechanisms of the various stations are placed in operation to properly present the upper end of the stack to the sheet pick-up, separating, transfer and gripping mechanisms, as previously described.

When the machine is in operation by closing the main motor circuit, the gripper carrier 5, of course, operates continuously and as the first set of grippers passes over the first station, the sheet pick-up, separating and transfer mechanisms will condition the top sheet of the stack and it will be gripped by number 1 gripper of the set of grippers on the gripper carrier. This will be repeated in order in the remaining stations as the set of grippers passes thereover, with the grippers 2, 3 and 4 successively gripping a sheet as the set passes thereover. The paper sheets gripped by the grippers are guided in their horizontal travel between and over the stacks by guide members 229 shown in Figs. 3 and 4.

As the sheets are picked up and gripped by the grippers, they will be automatically arranged in proper sequence in superposed relationship and shingled an amount determined by the spacing between the grippers. When the set of grippers has passed the last station and approaches the delivery end of the machine, the grippers will be automatically opened to release the sheets so that they will be delivered from the machine on the delivery conveyor in the same superposed, shingled and collated condition in which they were gathered.

The sheets in the machine may be replenished at each station in each magazine without interrupting the operation of the machine. Likewise, in the event that the number of sheets to be collated is less than the number of stations in the machine, one of the stations may be cut out without affecting the operation of the machine or the operations at the remaining stations.

Because of the inherent characteristics of the machine and the mechanical principles upon which it operates, it is obvious that the machine may run at exceedingly high speeds to handle sheets, pages or forms in large volume. Further, inasmuch as there is a sensing and a detection mechanism for instantly indicating improper operation of any of the parts or errors or omissions in conjunction with paper feeding, the machine will be instantly stopped in the event of misoperation so that the error or maladjustment may be immediately corrected to materially reduce breakdown time as well as prevent producing improperly collated sets.

In the specification as well as in the claims the machine is described as assembling a plurality of paper sheets such as printed forms, pamphlet pages, and like material. Actually, this machine will operate upon and collate such material as signatures, folded forms, groups of individual sheets held together by adhesive, wire stitching or sewing. Also, it will gather and collate individual elements of the completed sets in varying sizes; that is, the various sheets or folded forms or similar sets fed from each magazine do not need to be uniform in relationship to each other. Certain of the elements fed from their respective stations can be longer or shorter in either or both dimensions than certain other elements, and in fact no two need to be of the same size. Moreover, the individual elements gathered, whether single sheets or folded forms, need not have square corners or straight edges. It is desirable, of course, that the leading edge to be grasped by the grippers shall be straight, but the other edges may be die-cut to irregular outlines.

I also desire to point out that the machine will operate on elements formed of material other than paper; for example, thin plastic or metal sheets which are either rigid or semi-rigid, and I, therefore, desire to point out that in the claims herein the words "sheet" and "sheets" shall include single sheets of any material or to signatures or bound groups of individual sheets.

I also desire to point out that the machine has the additional feature that the uppermost sheet in each station is lifted from the stack and conveyed to the gripper with a motion and through a path of travel which avoids scuffing, thereby making the machine entirely practical to assemble and collate sheets containing "spot" carbon or having a sheet of carbon already affixed to it. Obviously, the next lower sheet in the pile will not be scuffed or marred by the movement of the top sheet into the grippers, nor will the sheet removed be drawn over the next succeeding one on the stack, so that high gloss work can be handled with perfect safety.

From the foregoing it is obvious that I have provided an exceedingly efficient collating machine for gathering and collating a plurality of sheets from separate stacks thereof, which machine will be efficient in operation and of large capacity, and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A machine of the character described comprising a plurality of sheet receiving means at separated stations to receive and support sheets in vertical stacks arranged in line formation, a gripper carrier to overlie the sheet stacks and travel in a horizontal path in parallelism with the line in which the stacks are disposed, a set of grippers carried by the carrier, the number of grippers in the set agreeing with the number of sheet receiving means, the grippers being spaced longitudinally of the carrier a distance substantially less than the length of the sheets, means automatically operating the grippers to successively grip sheets from the stacks in sequence as the grippers travel over the stacks, and means for subsequently operating the grippers as they reach a fixed point to release the gripped sheets.

2. A machine of the charcater described comprising a plurality of sheet receiving and feeding means to receive and support sheets in registered relation and in vertical stacks arranged in line formation, a gripper carrier to overlie the sheet stacks and travel in a horizontal path in parallelism with the line in which the stacks are disposed, a plurality of sets of grippers carried by the carrier, the number of grippers in each set corresponding to the number of sheet receiving means, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers as they reach a fixed point to release the gripped sheets.

3. A machine of the character described comprising a plurality of sheet receiving means to receive and support sheets in stacked relation, such stacks extending upwardly at an acute angle to the vertical, the stacks being disposed in line formation, an endless gripper carrier overlying the sheet stacks and travelling continuously at a constant speed through a horizontal path in parallelism with the line in which the stacks are arranged, a set of grippers carried by the carrier, the number of grippers in the set agreeing with the number of sheet receiving means, the grippers being spaced longitudinally of the carrier a distance substantially less than the length of the sheets, means automatically operating the grippers to sucessively grip sheets from the stacks in sequence as the grippers travel over the stacks, means for subsequently operating the grippers as they reach a fixed point to release the gripped sheets.

4. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier to overlie the sheet stacks and travel through a horizontal path in parallelism with the line in which the stacks are disposed, a set of grippers carried by the carrier, the number of grippers in the set agreeing with the number of sheet receiving means, the grippers being spaced longitudinally of the carrier a distance substantially less than the length of the sheets, means automatically operating the grippers to successively grip sheets from the stacks in sequence as the grippers travel over the stacks, and means for subsequently operating the grippers as they reach a fixed point to release the gripped sheets.

5. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier overlying the sheet stacks and travelling continuously at a constant speed through a horizontal path in parallelism with the line in which the stacks are arranged, a plurality of sets of grippers carried by the carrier, the number of grippers in each set corresponding to the number of sheet receiving means, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, means for subsequently operating the grippers sucessively as they reach a fixed point in their travel and in a sequence the reverse of that in which they gripped the sheets to release the sheets.

6. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a set of grippers carried by the carrier, the number of grippers in the set ageeing with the number of sheet receiving means, the grippers being spaced longitudinally of the carrier a distance substantially less than the length of the sheets, means automatically operating the grippers to successively grip sheets from the stacks in sequence as the grippers travel over the stacks, and means for subsequently operating the grippers as they reach a fixed point to release the gripped sheets.

7. A device of the character described comprising a plurality of sheet receiving means at separated stations to receive and support sheets in vertical stacks arranged in line formation, an endless gripper carrier overlying the sheet stacks and travelling continuously at a constant speed through a horizontal path in parallelism with the line in which the stacks are arranged, a plurality of sets of grippers carried by the carrier, the number of grippers in each set corresponding to the number of sheet receiving means, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers successively as they reach a fixed point in their travel and in a sequence the reverse of that in which they gripped the sheets to release the sheets.

8. A machine of the character described comprising a plurality of sheet receiving means to receive and support sheets in stacked relation, such stacks extending upwardly at an acute angle to the vertical, the stacks being disposed in line formation, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier at equally spaced intervals therealong, the spacing of such sets being such as to substantially simultaneously present a separate set in operative relation to each sheet stack as the carrier operates, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers successively as they reach a fixed point in their travel and in a sequence the reverse of that in which they gripped the sheets to release the sheets.

9. A machine of the character described comprising a plurality of sheet receiving and feeding means to receive and support sheets in registered relation and in vertical stacks arranged in line formation, an endless gripper carrier arranged over the sheet stacks with its lower flight overlying the sheet stacks and travelling at a constant speed in a single direction in a fixed horizontal path over said stacks in a line parallel to the line in which said stacks are arranged, a set of grippers carried by the carrier, the number of grippers in the set agreeing with the number of sheet receiving means, the grippers being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers successively as they reach a fixed point in their travel and in a sequence the reverse of 10. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier, the number of grippers in each set corresponding to the number of sheet receiving means, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers successively as they reach a fixed point in their travel and in a sequence the reverse of that in which they gripped the sheets to release the sheets.

11. A machine of the character described comprising a plurality of sheet receiving and feeding means to receive and support sheets in registered relation and in vertical stacks arranged in line formation, a gripper carrier to overlie the sheet stacks and travel in a horizontal path in parallelism with the line in which the stacks are disposed, a plurality of sets of grippers carried by the carrier, the number of grippers in each set corresponding to the number of sheet receiving means, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers as they reach a fixed point to release the gripped sheets.

12. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier overlying the sheet stacks and travelling continuously at a constant speed through a horizontal path in parallelism with the line in which the stacks are arranged, a plurality of sets of grippers carried by the carrier, the number of grippers in each set corresponding to the number of sheet receiving means, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers successively as they reach a fixed point in their travel and in a sequence the reverse of that in which they gripped the sheets to release the sheets.

13. A machine of the character described comprising a plurality of sheet receiving means at separated stations to receive and support sheets in vertical stacks arranged in line formation, an endless gripper carrier overlying the sheet stacks and travelling continuously at a constant speed through a horizontal path in parallelism with the line in which the stacks are arranged, a plurality of sets of grippers carried by the carrier, the number of grippers in each set corresponding to the number of sheet receiving means, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers successively as they reach a fixed point in their travel and in a sequence the reverse of that in which they gripped the sheets to release the sheets.

14. A machine of the character described comprising a plurality of sheet receiving means to receive and support sheets in stacked relation, such stacks extending upwardly at an acute angle to the vertical, the stacks being disposed in line formation, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier at equally spaced intervals therealong, the spacing of such sets being such as to substantially simultaneously present a separate set in operative relation to each sheet stack as the carrier operates, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers successively as they reach a fixed point in their travel and in a sequence the reverse of that in which they gripped the sheets to release the sheets.

15. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier, the number of grippers in each set corresponding to the number of sheet receiving means, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, and means for subsequently operating the grippers successively as they reach a fixed point in their travel and in a sequence the reverse of that in which they gripped the sheets to release the sheets.

16. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier at equally spaced intervals therealong, the spacing of such sets being such as to substantially simultaneously present a separate set in operative relation to each sheet stack as the carrier operates, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, a sheet conditioning mechanism disposed over each stack to condition a sheet at each stack for gripping, operating means for operating said conditioning mechanism in synchronism with the gripper means, and means for subsequently operating the grippers successively as they reach a fixed point in their travel and in a sequence the reverse of that in which they gripped the sheets to release the sheets.

17. A machine of the character described comprising a plurality of sheet receiving means to receive and support sheets in stacked relation, such stacks extending upwardly at an acute angle to the vertical, the stacks being disposed in line formation, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier, the spacing of such sets being such as to substantially simultaneously present a separate set in operative relation to each sheet stack as the carrier operates, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, a sheet conditioning mechanism disposed over each stack to condition a sheet at each stack for gripping, operating means for operating said conditioning mechanism in synchronism with the gripper means, and means for subsequently operating the grippers successively as they reach a fixed point in their travel and in a sequence the reverse of that in which they gripped the sheets to release the sheets.

18. A machine of the character described comprising a plurality of sheet receiving means to receive and support sheets in stacked relation, such stacks extending upwardly at an acute angle to the vertical, the stacks being disposed in line formation, an endless gripper carrier overlying the sheet stacks and travelling continuously at a constant speed through a horizontal path in parallelism with the line in which the stacks are arranged, a plurality of sets of grippers carried by the carrier, the number of grippers in each set corresponding to the number of sheet receiving means, the grippers of each set being spaced longitudinally of the carrier a distance substantially less than the length of the sheets, means automatically operating the grippers to successively grip sheets from the stacks in sequence as the grippers travel over the stacks, a sheet conditioning mechanism disposed over each stack to condition a sheet at each stack for gripping, operating means for operating said conditioning mechanism in synchronism with the gripper means, and means for subsequently operating the grippers as they reach a fixed point to release the gripped sheets.

19. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier at equally spaced intervals therealong, the spacing of such sets being such as to substantially simultaneously present a separate set in operative relation to each sheet stack as the carrier operates, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, cooperating sheet pick-up means, sheet separating means and sheet transfer means for conditioning a sheet at each stack for gripping, and means for subsequently operating the grippers successively as they reach a fixed point in their travel and in a sequence the reverse of that in which they gripped the sheets to release the sheets.

20. A machine of the character described comprising a plurality of sheet receiving means to receive and support sheets in stacked relation, such stacks extending upwardly at an acute angle to the vertical, the stacks being disposed in line formation, an endless gripper carrier overlying the sheet stacks and travelling continuously at a constant speed through a horizontal path in parallelism with the line in which the stacks are arranged, a plurality of sets of grippers carried by the carrier, the number of grippers in each set corresponding to the number of sheet receiving means, means automatically operating the grippers to successively grip sheets from the stacks in sequence as the grippers travel over the stacks, cooperating sheet pick-up means, sheet separating means and sheet transfer means for conditioning a sheet at each stack for gripping, and means for subsequently operating the grippers as they reach a fixed point to release the gripped sheets.

21. A machine of the character described comprising a plurality of sheet receiving and feeding means to receive and support sheets in registered relation and in vertical stacks arranged in line formation, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier, the number of grippers in each set corresponding to the number of sheet receiving means, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, cooperating sheet pick-up means, sheet separating means and sheet transfer means for conditioning a sheet at each stack for gripping, and means for subsequently operating the grippers successively as they reach a fixed point in their travel and in a sequence the reverse of that in which they gripped the sheets to release the sheets.

22. A machine of the character described comprising a plurality of sheet receiving means to receive and support sheets in stacked relation, such stacks extending upwardly at an acute angle to the vertical, the stacks being disposed in line formation, an endless gripper carrier to overlie the sheet stacks and travel through a horizontal path in parallelism with the line in which the stacks are disposed, a set of grippers carried by the carrier, the number of grippers in the set agreeing with the number of sheet receiving means, the grippers being spaced longitudinally of the carrier a distance substantially less than the length of the sheets, means automatically operating the grippers to successively grip sheets from the stacks in sequence as the grippers travel over the stacks, cooperating sheet pick-up means, sheet separating means and sheet transfer means for conditioning a sheet at each stack for gripping, and means for subsequently operating the grippers as they reach a fixed point to release the gripped sheets.

23. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier at equally spaced intervals therealong, the spacing of such sets being such as to substantially simultaneously present a separate set in operative relation to each sheet stack as the carrier operates, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, cooperating sheet pick-up means, sheet separating means and sheet transfer means for conditioning a sheet at each stack for gripping, sensing means operated when multiple sheets are picked up, and means for subsequently operating the grippers successively as they reach a fixed point in their travel and in a sequence the reverse of that in which they gripped the sheets to release the sheets.

24. A machine of the character described comprising a plurality of sheet receiving and feeding means to receive and support sheets in registered relation and in vertical stacks arranged in line formation, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier, the number of grippers in each set corresponding to the number of sheet receiving means, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, cooperating sheet pick-up means, sheet separating means and sheet transfer means for conditioning a sheet at each stack for gripping, sensing means operated when multiple sheets are picked up, and means for subsequently operating the grippers successively as they reach a fixed point in their travel and in a sequence the reverse of that in which they gripped the sheets to release the sheets.

25. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier to overlie the sheet stacks and travel through a horizontal path in parallelism with the line in which the stacks are disposed, a set of grippers carried by the carrier, the number of grippers in the set agreeing with the number of sheet receiving means, the grippers being spaced longitudinally of the carrier a distance substantially less than the length of the sheets, means automatically operating the grippers to successively grip sheets from the stacks in sequence as the grippers travel over the stacks, means for subsequently operating the grippers as they reach a fixed point to release the gripped sheets, and means automatically operating to maintain the tops of the stacks at operational level within predetermined upper and lower limits.

26. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a set of grippers carried by the carrier, the number of grippers in the set agreeing with the number of sheet receiving means, the grippers being spaced longitudinally of the carrier a distance substantially less than the length of the sheets, means automatically operating the grippers to successively grip sheets from the stacks in sequence as the grippers travel over the stacks, means for subsequently operating the grippers as they reach a fixed point to release the gripped sheets, and means automatically operating to maintain the tops of the stacks at operational level within predetermined upper and lower limits.

27. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier, the number of grippers in each set corresponding to the number of sheet receiving means, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, means for subsequently operating the grippers successively as they reach a fixed point in their travel and in a sequence the reverse of that in which they gripped the sheets to release the sheets, and means automatically operating to maintain the tops of the stacks at operational level within predetermined upper and lower limits.

28. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier overlying the sheet stacks and travelling continuously at a constant speed through a horizontal path in parallelism with the line in which the stacks are arranged, a plurality of sets of grippers carried by the carrier, the number of grippers in each set corresponding to the number of sheet receiving means, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, means for subsequently operating the grippers successively as they reach a fixed point in their travel and in a sequence the reverse of that in which they gripped the sheets to release the sheets, and means automatically operating to maintain the tops of the stacks at operational level within predetermined upper and lower limits.

29. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier, the number of grippers in each set corresponding to the number of sheet receiving means, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, means for subsequently operating the grippers successively as they reach a fixed point in their travel and in a sequence the reverse of that in which they gripped the sheets to release the sheets, and means automatically operating to maintain the tops of the stacks at operational level within predetermined upper and lower limits.

30. A machine of the character described comprising a plurality of sheet receiving and feeding means to receive and support superimposed sheets in registered stacked relation with the stacks disposed at an acute angle to the vertical and in line formation, said means operable to feed the stacks upwardly in a path parallel to the line of vertical extension of the stacks, an endless gripper carrier arranged over the sheet stacks with its lower flight overlying the sheet stacks and travelling at a constant speed in a single direction in a fixed horizontal path over said stacks in a line parallel to the line in which said stacks are arranged, a plurality of sets of grippers carried by the carrier at equally spaced intervals therealong, the spacing of such sets being such as to substantially simultaneously present a separate set in operative relation to each sheet stack as the carrier operates, the grippers of each set being spaced longitudinally of the carrier a distance substantially less than the length of the sheets, means automatically and separately operating the grippers to grip a sheet as the set comes into operative relation to the sheet stacks, the grippers of each set being operated in sequence starting with the trailing gripper and ending with the leading gripper of the set whereby the set will grip sheets successively from the sheet stacks commencing with the first one traversed by the set, a sheet conditioning mechanism disposed over each stack to condition a sheet at each stack for gripping, operating means for operating said conditioning mechanism in synchronism with the gripper means, means for subsequently operating the grippers successively as they reach a fixed point in their travel and in a sequence the reverse of that in which they gripped the sheets to release the sheets, and means automatically operating to maintain the tops of the stacks at operational level within predetermined upper and lower limits.

31. A machine as set out in claim 18, in which each sheet conditioning mechanism includes a contrivance for raising the forward ends of the sheets of its station to allow the sheets to be gripped.

32. A machine as set out in claim 18, in which each sheet conditioning mechanism includes a first suction head for engaging the upper surface of the topmost sheet and lifting the forward end of the topmost sheet, and a second suction head for subsequently engaging the topmost sheet on its under surface and further lifting the forward end of the sheet to a position to be gripped by a gripper.

33. A machine as set out in claim 18, in which the means for automatically operating the grippers includes a bodily stationary rotary cam at each station engageable with the gripper of each set of grippers corresponding to said station to cause opening and closing of said gripper, and in which the means for subsequently operating the grippers comprises a stationary cam at the delivery end of the machine disposed to engage the grippers.

34. A machine as set out in claim 18, in which each sheet conditioning mechanism includes a contrivance for raising the forward ends of the sheets to allow the sheets to be gripped, and in which the means for automatically operating the grippers includes a cam at each station engageable with the gripper of each set of grippers corresponding to the station to cause opening and closing of said gripper.

35. A machine as set out in claim 18, in which each sheet conditioning mechanism includes a first suction head for engaging the upper surface of the topmost sheet at its station and lifting the forward end of the topmost sheet, and a second suction head for subsequently engaging the topmost sheet on its under surface and further lifting the forward end of the sheet to a position to be gripped by a gripper, and in which the means for automatically operating the grippers includes a cam at each station engageable with the gripper of each set of grippers corresponding to the station to cause opening and closing of said gripper.

36. A machine as set out in claim 18, in which there are means in each station for feeding the stack of sheets upwardly to maintain a supply of sheets in registry with the conditioning mechanism, and in which the means for automatically operating the grippers includes a bodily stationary rotary cam at each station engageable with the gripper of each set of grippers corresponding to said station to cause opening and closing of said gripper, and in which each sheet conditioning mechanism includes a first suction head for engaging the upper surface of the topmost sheet and lifting the forward end of the topmost sheet, and a second suction head for subsequently engaging the topmost sheet on its under surface and further lifting the forward end of the sheet to a position to be gripped by a gripper.

LEWIS C. PEARCE.

No references cited.